United States Patent
Maattanen et al.

(10) Patent No.: US 12,487,366 B2
(45) Date of Patent: Dec. 2, 2025

(54) METHODS AND SYSTEMS FOR SIGNALLING EPHEMERIS DATA IN A NON-TERRESTRIAL NETWORK

(71) Applicant: TELEFONAKTIEBOLAGET LM ERICSSON (PUBL), Stockholm (SE)

(72) Inventors: Helka-Liina Maattanen, Helsinki (FI); Johan Rune, Lidingo (SE); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/034,775

(22) PCT Filed: Oct. 29, 2021

(86) PCT No.: PCT/IB2021/060046
§ 371 (c)(1),
(2) Date: May 1, 2023

(87) PCT Pub. No.: WO2022/091030
PCT Pub. Date: May 5, 2022

(65) Prior Publication Data
US 2024/0019583 A1    Jan. 18, 2024

Related U.S. Application Data

(60) Provisional application No. 63/107,475, filed on Oct. 30, 2020.

(51) Int. Cl.
*G01S 19/25* (2010.01)
*H04B 7/185* (2006.01)
(Continued)

(52) U.S. Cl.
CPC ........ *G01S 19/258* (2013.01); *H04B 7/18541* (2013.01); *H04W 16/28* (2013.01); *H04W 48/10* (2013.01); *H04W 48/20* (2013.01)

(58) Field of Classification Search
CPC ..... H04W 16/28; H04W 48/10; H04W 48/20; H04W 64/003; H04W 84/06; H04B 7/18541; H04B 7/1855; G01S 19/258
See application file for complete search history.

(56) References Cited

U.S. PATENT DOCUMENTS

| 2019/0245614 A1 | 8/2019 | Lucky |
| 2023/0239043 A1* | 7/2023 | Xu ..................... H04B 7/18547 455/427 |

FOREIGN PATENT DOCUMENTS

| JP | 2019533339 A | 11/2019 |
| WO | 2018052744 A2 | 3/2018 |

OTHER PUBLICATIONS

Paonni et al. "Improving the Performance of Galileo E1-OS by Optimizing the I/NAV Navigation Message," Proceedings of the 32nd International Technical Meeting of the Satellite Division of The Institute of Navigation, Miami, Florida, Sep. 2019, pp. 1134-1146. https://doi.org/10.33012/2019.17048 (Year: 2019).*

(Continued)

*Primary Examiner* — David S Huang
(74) *Attorney, Agent, or Firm* — ERICSSON INC.

(57) ABSTRACT

A method performed by a wireless device includes receiving ephemeris data from a network node associated with a first cell. The ephemeris data is associated with a satellite serving a second cell, and the ephemeris data is coarse ephemeris data comprising less than full accuracy than full ephemeris data. The wireless device uses the coarse ephemeris data to locate a beam associated with the second cell and synchronizes with the second cell.

20 Claims, 14 Drawing Sheets

(51) Int. Cl.
*H04W 16/28* (2009.01)
*H04W 48/10* (2009.01)
*H04W 48/20* (2009.01)

(56) References Cited

OTHER PUBLICATIONS

Thales, "Considerations on satellite ephemeris", 3GPP TSG RAN WG2 eMeeting #111-e, R2-2007574, Aug. 17-28, 2020, 5 Pages, e-Meeting.
3GPP, "3rd Generation Partnership Project; Technical Specification Group Radio Access Network; Solutions for NR to support non-terrestrial networks (NTN) (Release 16)", TR 38.821 V16.0.0, Dec. 2019.
3GPP, "3rd Generation Partnership Project; Technical Specification Group Radio Access Network; Study on New Radio (NR) to support non-terrestrial networks (Release 15)", TR 38.811 V15.4.0, Sep. 2020, 127 pages.
Ericsson, "Ephemeris data," Tdoc R2-1912597, 3GPP TSG-RAN WG2 #107bis, Chongqing, China, Oct. 14-18, 2019.
Thales, "Study on solutions evaluation for NR to support Non Terrestrial Network", 3GPP TSG RAN meeting #80, RP-181370, Jun. 11-14, 2018, La Jolla, USA.

* cited by examiner

METHODS AND SYSTEMS FOR SIGNALLING EPHEMERIS DATA IN A NON-TERRESTRIAL NETWORK

This application is a 371 of International Application No. PCT/IB2021/060046, filed on Oct. 29, 2021, which claims the benefit of U.S. Provisional Application No. 63/107,475, filed Oct. 30, 2020, the disclosure of which is fully incorporated herein by reference.

TECHNICAL FIELD

The present disclosure relates, in general, to wireless communications and, more particularly, systems and methods for signalling ephemeris data in a Non-Terrestrial Network (NTN).

BACKGROUND

In 3GPP Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since Release 13 Narrowband-Internet of Things (NB-IoT) and Long Term Evolution for Machines (LTE-M) are part of the LTE specifications and provide connectivity to massive machine type communications (mMTC) services.

In 3GPP Release 15, the first release of the 5G system (5GS) was specified. This is a new generation's radio access technology intended to serve use cases such as enhanced mobile broadband (eMBB), ultra-reliable and low latency communication (URLLC) and mMTC. 5G includes the New Radio (NR) access stratum interface and the 5G Core Network (5GC). The NR physical and higher layers are reusing parts of the LTE specification, and to that add needed components when motivated by the new use cases.

In Release 15, 3GPP also began preparing NR for operation in a Non-Terrestrial Network (NTN). The work was performed within the study item "NR to support Non-Terrestrial Networks" and resulted in 3GPP TR 38.811. See, 3GPP TR 38.811, Study on New Radio (NR) to support non-terrestrial networks.

In Release 16, the work to prepare NR for operation in an NTN network continues with the study item "Solutions for NR to support Non-Terrestrial Network". In parallel, the interest to adapt LTE for operation in NTN grew. As a consequence, 3GPP is considering introducing support for NTN in both LTE and NR in Release 17.

A satellite radio access network usually includes a satellite that refers to a space-borne platform; an earth-based gateway that connects the satellite to a base station or a core network, depending on the choice of architecture; a feeder link that refers to the link between a gateway and a satellite; and an access link that refers to the link between a satellite and a UE.

Depending on the orbit altitude, a satellite may be categorized as low earth orbit (LEO), medium earth orbit (MEO), or geostationary earth orbit (GEO) satellite, as follows:
  LEO: typical heights ranging from 250-1,500 km, with orbital periods ranging from 90-120 minutes.
  MEO: typical heights ranging from 5,000-25,000 km, with orbital periods ranging from 3-15 hours.
  GEO: height at about 35,786 km, with an orbital period of 24 hours.

The significant orbit height means that satellite systems are characterized by a path loss that is significantly higher than what is expected in terrestrial networks. To overcome the pathloss it is often required that the access and feeder links are operated in line of sight conditions, and that the UE is equipped with an antenna offering high beam directivity.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 1 illustrates an example architecture of a satellite network with bent pipe transponders.

The NTN beam may in comparison to the beams observed in a terrestrial network be very wide and cover an area outside of the area defined by the served cell. Beam covering adjacent cells will overlap and cause significant levels of intercell interference. To overcome the large levels of interference a typical approach is for NTN to configure different cells with different carrier frequencies and polarization modes. Throughout this document we use the terms beam and cell interchangeably, unless explicitly noted otherwise. Although this disclosure is focused on NTN, the methods proposed apply to any wireless network dominated by line of sight conditions.

In 3GPP TR 38.821, it has been captured that ephemeris data should be provided to the UE, for example to assist with pointing a directional antenna (or an antenna beam) towards the satellite, and to calculate a correct Timing Advance (TA) and Doppler shift. See, RP-181370, Study on solutions evaluation for NR to support non-terrestrial Network. Procedures on how to provide and update ephemeris data have not yet been studied in detail.

A satellite orbit can be fully described using 6 parameters. Exactly which set of parameters is chosen can be decided by the user and/or network provider; many different representations are possible. For example, a choice of parameters used often in astronomy is the set (a, ε, i, Ω, ω, t). Here, the semi-major axis a and the eccentricity ε describe the shape and size of the orbit ellipse; the inclination i, the right ascension of the ascending node Ω, and the argument of periapsis ω determine its position in space, and the epoch t determines a reference time (e.g. the time when the satellites moves through periapsis). FIG. 2 illustrate a set of parameters.

As an example of a different parametrization, mean motion n and mean anomaly M may be used instead of a and t. A completely different set of parameters is the position and velocity vector $(x, y, z, v_x, v_y, v_z)$ of a satellite. These are sometimes called orbital state vectors. They can be derived from the orbital elements and vice versa, since the information they contain is equivalent. All these formulations (and many others) are possible choices for the format of ephemeris data to be used in NTN. To enable further progress, the format of the data should be agreed upon.

As shown above, it is important that a UE can determine the position of a satellite with accuracy of at least a few meters. However, several studies have shown that this might be hard to achieve. On the other hand, LEO satellites often have Global Navigation Satellite System (GNSS) receivers and can determine their position with some meter level accuracy.

Another aspect captured in 3GPP TR 38.821 is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit and ranges from weekly to multiple times a day for satellites on very low orbits which are exposed to strong atmospheric drag and need to perform correctional maneuvers often. So, while it seems possible to provide the satellite position with the required accuracy, care needs to be taken to meet these requirements, e.g. when choosing the ephemeris data format, or the orbital model to be used for the orbital propagation.

System information (SI) is an important function in cellular communication systems. It provides the wireless devices, also referred to as user equipments (UEs), with the information needed to access the network and to perform other functions, such as reselecting between cells and receiving Multimedia Broadcast Multicast Services (MBMS) transmissions in a cellular network operating in accordance with a 3GPP standard. In addition, in 3GPP cellular systems the system information mechanism is used for conveying Public Warning System messages, such as Earthquake and Tsunami Warning System (ETWS) messages and Commercial Mobile Alert System (CMAS) messages in 3GPP cellular communication systems.

In LTE, the system information is provided using periodic broadcasting in each cell. The SI is divided into a Master Information Block (MIB) and a number of System Information Blocks (SIBs). The MIB and SIB1 are broadcast with periods that are fixed in the standard. The other SIBs are broadcast with different periods, as configured in SIB1. For the 5G system referred to as New Radio (NR) (where the RAN is referred to as Next Generation Radio Access Network (NG-RAN) and the core network is referred to as Next Generation Core (NGC)) 3GPP has partly changed the principles for distribution of system information (SI) that are used in LTE.

For NR the SI is into "minimum SI" and "other SI", where the minimum SI is the SI that is required to access the cell, and, in the case of NR stand-alone mode (i.e. not in dual connection configuration with LTE), the minimum SI also contains scheduling information for the SIBs of the other SI. The minimum SI consists of the Master Information Block (MIB) and System Information Block type 1 (SIB1). SIB1 is also referred to as "Remaining Minimum System Information" (RMSI). At least in NR stand-alone mode, the minimum SI is periodically broadcast in a cell, while the other SI may be either periodically broadcast or delivered on-demand, triggered by a request from a UE. The granularity of the division into periodically broadcast SI and on-demand SI is on the level of SI messages. Whether a certain SI message is periodically broadcast or provided on-demand is indicated in SIB1 (using the si-BroadcastStatus parameter).

A UE in RRC_IDLE, RRC_INACTIVE or RRC_CONNECTED state can request an on-demand SI message either using a random access preamble (referred to as the Msg1 based method) or using a random access message 3 (referred to as the Msg3 based method). If random access preamble (Msg1) transmissions are used, there may be different preambles for requesting different SI message(s) (and consequently the SIB(s) allocated to the SI message(s)) of the other SI. The mapping between a random access preamble and the SI message to be requested is configured in SIB1. If random access message 3 (Msg3) transmissions are used, a UE may in such a message specify which SI message(s) (and consequently the SIB(s) allocated to the SI message(s)) of the other SI the UE wants the network to broadcast/transmit.

A request for an on-demand SI message triggers the network to broadcast the requested SI message for a limited time in accordance with the scheduling information associated with the concerned SI message in SIB1. The network will also transmit an acknowledgement message to the requesting UE. For the Msg1 based request method, the network responds with an acknowledging random access message 2 (Msg2). For the Msg3 based requests method, the network responds with an acknowledging random access message 4 (Msg4).

Periodic broadcast of system information (SI) is designed mostly according to the same principles in NR as in LTE. Similar to LTE, the Master Information Block (MIB) is transmitted in a fixed location in relation to the synchronization signals. The situation for SIB1 is slightly different in NR than in LTE. The periodicity of SIB1 is 160 ms, but it may be repeated a number of times within these 160 ms and the transmission configuration is indicated in the MIB. The remaining SIBs are scheduled in SIB1 and transmitted on the Physical Downlink Shared Channel (PDSCH) in the same way as in LTE. Different SIBs can have different periodicities. SIBs with the same periodicity are allocated to the same SI message and every SI message is associated with a periodic SI-window within which the SI message should be transmitted. The SI-windows of the different SI messages have different periodicities, are non-overlapping and they all have the same duration. Note that the exact transmission occasion of an SI message is not configured, only the window within which it will be transmitted. To indicate that a PDSCH transmission contains an SI message, the CRC of the Physical Downlink Control Channel (PDCCH) scheduling Downlink Control Information (DCI), which allocates the PDSCH transmission resources, is scrambled with the System Information-Radio Network Temporary Identifier (SI-RNTI). A receiving UE leverages the non-overlapping property of the SI-windows to identify which SI message it receives (and hence which SIBs the SI message contains), the SI messages in themselves do not have any indication to distinguish one SI message from the other. FIG. 3 illustrates an allocation of SIBs to SI messages and scheduling of SI messages in SI-windows. Each SI message is transmitted in its own SI-window, whose occurrence in time depends on the SI message periodicity and the SI message's position in the list in SIB1.

Note that every SI message has a configured schedule, irrespective of whether it is periodically broadcast or provided on-demand. In the latter case, the scheduled broadcast occasions are utilized only when the network, i.e. gNB, has received a request for the concerned SI message. The ASN.1 definitions of the SI scheduling related parameters in SIB1 and associated field descriptions are indicated below.

SI-SchedulingInfo Information Element

```
-- ASN1START
-- TAG-SI-SCHEDULINGINFO-START
SI-SchedulingInfo ::=        SEQUENCE {
    schedulingInfoList       SEQUENCE (SIZE (1..maxSI-Message)) OF SchedulingInfo,
```

-continued

```
    si-WindowLength            ENUMERATED {s5, s10, s20, s40, s80, s160,
s320, s640,
                                  s1280},
    si-RequestConfig           SI-RequestConfig      OPTIONAL, -- Cond
MSG-1
    si-RequestConfigSUL        SI-RequestConfig      OPTIONAL, -- Cond
SUL-MSG-1
    systemInformationAreaID    BIT STRING (SIZE (24))   OPTIONAL, --
Need R
    ...
}
SchedulingInfo ::=             SEQUENCE {
    si-BroadcastStatus         ENUMERATED {broadcasting, notBroadcasting},
    si-Periodicity             ENUMERATED {rf8, rf16, rf32, rf64, rf128, rf256,
                                  rf512},
    sib-MappingInfo            SIB-Mapping
}
SIB-Mapping ::=                SEQUENCE (SIZE (1..maxSIB)) OF SIB-TypeInfo
SIB-TypeInfo ::=               SEQUENCE {
    type                       ENUMERATED {sibType2, sibType3, sibType4,
sibType5,
                                  sibType6, sibType7, sibType8, sibType9,
                                  sibType10-v1610, sibType11-v1610,
                                  sibType12-v1610, sibType13-v1610,
                                  sibType14-v1610,
                                  spare3, spare2, spare1,... },
    valueTag                   INTEGER (0..31)       OPTIONAL, -- Cond SIB-
TYPE
    areaScope                  ENUMERATED {true}     OPTIONAL -- Need S
}
-- TAG-SI-SCHEDULINGINFO-STOP
-- ASN1STOP
```

| SchedulingInfo field descriptions |
|---|
| areaScope |
| Indicates that a SIB is area specific. If the field is absent, the SIB is cell specific. |
| si-BroadcastStatus |
| Indicates if the SI message is being broadcasted or not. Change of si-BroadcastStatus should not result in system information change notifications in Short Message transmitted with P-RNTI over DCI (see clause 6.5). The value of the indication is valid until the end of the BCCH modification period when set to broadcasting. |
| si-Periodicity |
| Periodicity of the SI-message in radio frames. Value rf8 corresponds to 8 radio frames, value rf16 corresponds to 16 radio frames, and so on. |

| SI-RequestResources field descriptions |
|---|
| ra-AssociationPeriodIndex |
| Index of the association period in the si-RequestPeriod in which the UE can send the SI request for SI message(s) corresponding to this SI-RequestResources, using the preambles indicated by ra-PreambleStartIndex and rach occasions indicated by ra-ssb-OccasionMaskIndex. |
| ra-PreambleStartIndex |
| If N SSBs are associated with a RACH occasion, where N >= 1, for the i-th SSB (i = 0, . . . , N − 1) |
| the preamble with preamble index = ra-PreambleStartIndex + i is used for SI request; For N < 1, the preamble with preamble index = ra-PreambleStartIndex is used for SI request. |
| si-RequestConfig |
| Configuration of Msg1 resources that the UE uses for requesting SI-messages for which si-BroadcastStatus is set to notBroadcasting. |
| si-RequestConfigSUL |
| Configuration of Msg1 resources that the UE uses for requesting SI-messages for which si-BroadcastStatus is set to notBroadcasting. |
| si-WindowLength |
| The length of the SI scheduling window. Value s5 corresponds to 5 slots, value s10 corresponds to 10 slots and so on. The network always configures si-Window Length to be shorter than or equal to the si-Periodicity. |

| | SI-RequestResources field descriptions |
|---|---|
| systemInformationAreaID | |
| Indicates the system information area that the cell belongs to, if any. Any SIB with areaScope within the SI is considered to belong to this systemInformationAreaID. The systemInformationAreaID is unique within a PLMN. | |

| Conditional presence | Explanation |
|---|---|
| MSG-1 | The field is optionally present, Need R, if si-BroadcastStatus is set to notBroadcasting for any SI-message included in SchedulingInfo. It is absent otherwise. |
| SIB-TYPE | The field is mandatory present if the SIB type is different from SIB6, SIB7 or SIB8. For SIB6, SIB7 and SIB8 it is absent. |
| SUL-MSG-1 | The field is optionally present, Need R, if this serving cell is configured with a supplementary uplink and if si-BroadcastStatus is set to notBroadcasting for any SI-message included in SchedulingInfo. It is absent otherwise. |

The basic principles for SI updates are the same in NR as in LTE. It is built around the concept of SI modification periods. With some exceptions, SI can only be updated at the border between two SI modification periods. Furthermore, a planned SI update has to be announced in the SI modification period prior to an actual SI update. Such announcements are performed using the paging mechanism, i.e. a notification on the paging channel is used to inform UEs in RRC_IDLE, UEs in RRC_INACTIVE and UEs in RRC_CONNECTED state about a coming system information change. In NR, notifications of coming SI updates are conveyed via so-called "Short Messages", i.e. included in the DCI (with the CRC scrambled with the P-RNTI) on the PDCCH, with or without an associated scheduled Paging message on the PDSCH. If the UE receives a DCI containing a Short Message including a systemInfoModification indication, it knows that the system information will change at the next SI modification period boundary.

A special case of SI update notification via a Short Message on the paging channel is when an etwsAndCmas-Indication parameter in the Short Message indicates that a public warning system message (Earthquake and Tsunami Warning System (ETWS) or Commercial Mobile Alert System (CMAS)) has been activated (or changed) in the SI. In this case, the UE knows that the update is applicable immediately and the UE should as soon as possible acquire and read the SIB(s) related to the concerned public warning. The UE has to read SIB1 to find out whether the notification concerns ETWS or CMAS.

SI updates are thus notified via the paging channel and consequently UEs have to monitor the paging channel, not only to receive paging targeting themselves, but also to receive possible SI update notifications (including Public Warning System (PWS) notifications). UEs in RRC_IDLE and RRC_INACTIVE state monitor their regular paging occasions (POs), i.e. one per paging Discontinuous Reception (DRX) cycle, and UEs in RRC_CONNECTED state can monitor any Paging Occasion (PO) for SI update notifications, but should monitor at least one PO per default paging cycle (indicated by the defaultPagingCycle parameter in SIB1).

There currently exist certain challenge(s). For example, ephemeris data consists of at least five parameters describing the shape and position in space of the satellite orbit. It also comes with a timestamp, which is the time when the parameters describing the orbit ellipse were obtained. The position of the satellite at any given time in the nearer future can be predicted from this data using orbital mechanics. The accuracy of this prediction will however degrade as one projects further and further into the future. The validity time of a certain set of parameters depends on many factors like the type and altitude of the orbit, but also the desired accuracy, and ranges from the scale of a few days to a few years. 3GPP is in Release 17 expected to adapt NR, and possibly LTE, for operation in an NTN. In NR and LTE, a UE is, when turned on, expected to perform an initial search over its supported frequency bands for a Public Land Mobile Network (PLMN) and a cell to camp on. In an NTN, a UE using a directional antenna must in worst case search for a satellite to camp on over the entire sky, from horizon to horizon. This effort, and thus the time required for the initial search can be significant. A similar problem arises when the UE should search for cells transmitted from another satellite, e.g. in preparation for a handover, where the network only informs the UE about the frequency (and possibly PCI) of neighbouring cells.

SUMMARY

Certain aspects of the present disclosure and their embodiments may provide solutions to these or other challenges. For example, according to certain embodiments, it is proposed that a network node associated with a serving cell may broadcast ephemeris data associated with other satellites serving neighbour cells. In particular embodiments, one way to reduce the required update frequency of other satellites' ephemeris data, as well as reducing the volume of the ephemeris data, is to have the serving network node only broadcast coarse ephemeris data about other satellites. The ephemeris data with full accuracy may only be broadcast by each satellite itself. Further, in a particular embodiment, the coarse ephemeris data associated with another satellite may come in the form of truncated ephemeris parameters, where one or more of the least significant bits (LSBs) are omitted.

According to certain embodiments, a method by a wireless device includes receiving ephemeris data from a network node associated with a first cell. The ephemeris data is associated with a satellite serving a second cell, and the ephemeris data is coarse ephemeris data comprising less than full accuracy than full ephemeris data. The wireless device uses the coarse ephemeris data to locate a beam associated with the second cell and synchronizes with the second cell.

According to certain embodiments, a wireless device is adapted to receive ephemeris data from a network node associated with a first cell. The ephemeris data is associated with a satellite serving a second cell, and the ephemeris data is coarse ephemeris data comprising less than full accuracy than full ephemeris data. The wireless device uses the coarse ephemeris data to locate a beam associated with the second cell and synchronizes with the second cell.

According to certain embodiments, a method by a network node serving a wireless device in a first cell includes obtaining ephemeris data associated with a satellite serving a second cell. The ephemeris data is coarse ephemeris data comprising less than full accuracy than full ephemeris data. The network node transmits, to the wireless device, the coarse ephemeris data.

According to certain embodiments, a network node serving a wireless device in a first cell is adapted to obtain ephemeris data associated with a satellite serving a second cell. The ephemeris data is coarse ephemeris data comprising less than full accuracy than full ephemeris data. The network node is adapted to transmit, to the wireless device, the coarse ephemeris data.

Certain embodiments may provide one or more of the following technical advantage(s). For example, one or more of the proposed solutions may enables efficient broadcasting of ephemeris data of neighbor cells/satellites. As another example a technical advantage may be that the time required for an initial search, by a UE, for a satellite to camp on over the entire sky can be reduced significantly by providing the UE with ephemeris data, which informs the UE about the location of the satellites and thus where the UE should point its antenna.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
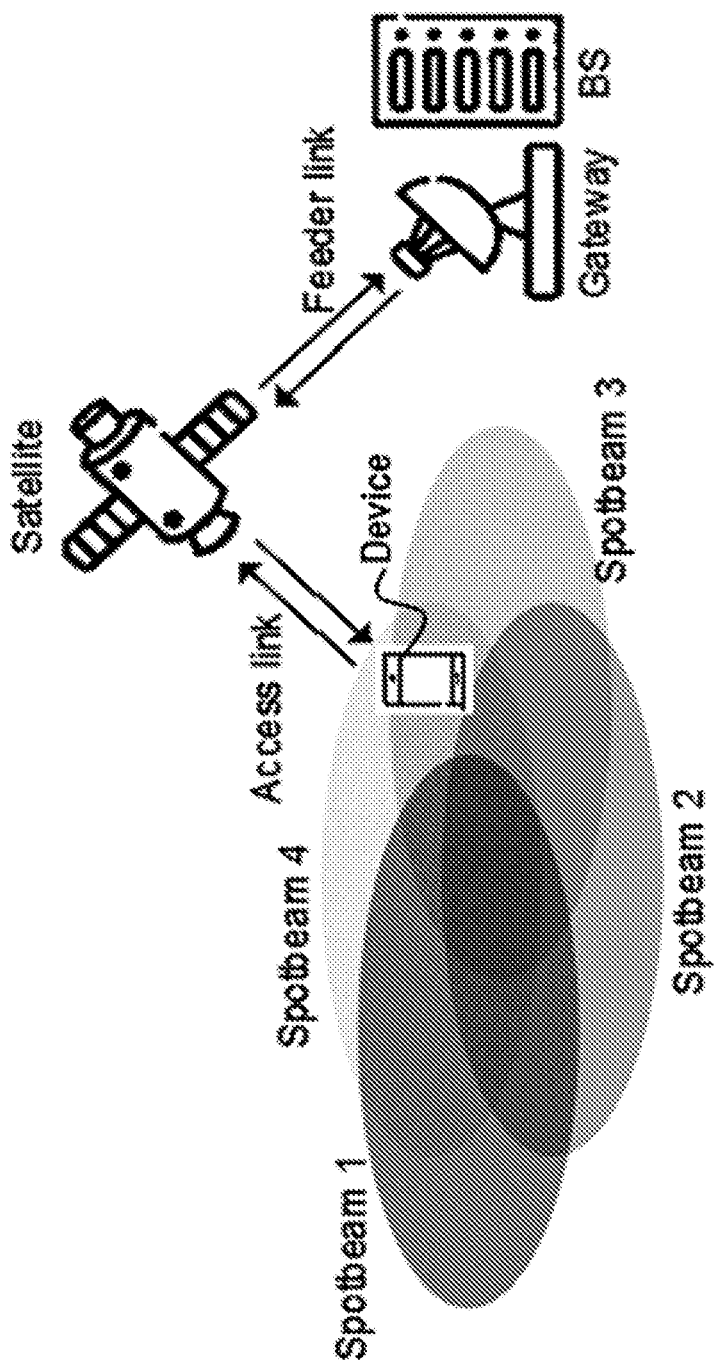
FIG. 1 illustrates an example architecture of a satellite network with bent pipe transponders.
Figure 2:
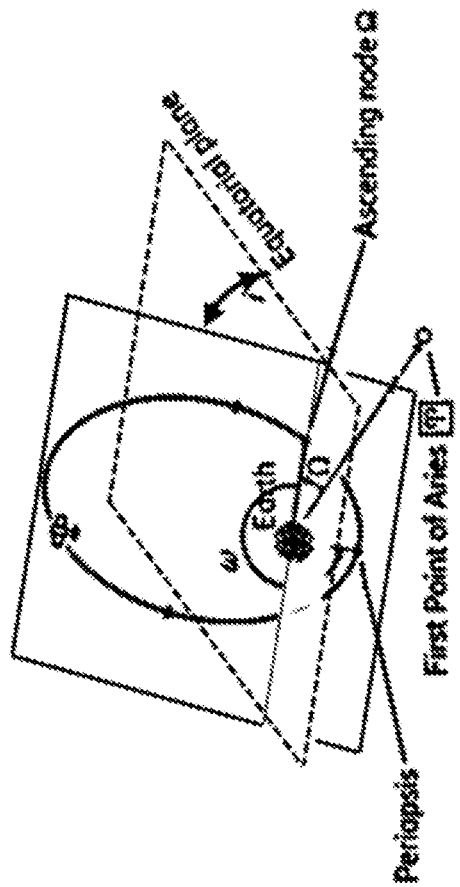
FIG. 2 illustrate a set of parameters.
Figure 2:
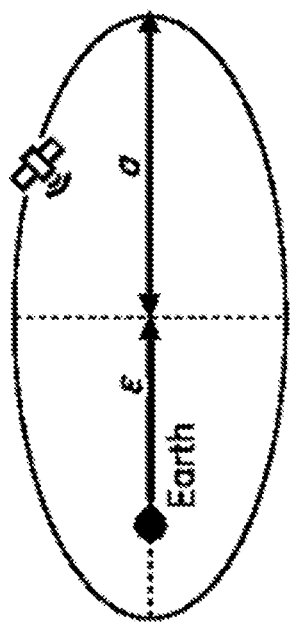

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

It may be recognized that, in NR, a UE will see cells and not necessarily satellites. While this disclosure talks about serving and neighbor satellites, it may be understood that, as used herein, the term serving satellite is used to refer to a satellite broadcasting the cell that is serving the UE. Likewise, the term neighbor satellite is used to refer to a satellite that is broadcasting the cell that is neighbor cell for the UE.

Broadcasting Coarse Ephemeris Data of Neighbour Cells' Satellites

To support UE mobility in RRC_IDLE and RRC_INACTIVE state, i.e. cell reselection, a satellite may broadcast, e.g. in the system information, ephemeris data of other satellites, optionally coupled with information about the cells these other satellites serve (such as carrier frequency, Bandwidth Part (BWP), Physical Cell Identity (PCI), Cell Global Identifier (CGI), Synchronization Signal Block (SSB) Absolute Radio Frequency Channel Number (ARFCN), SSB Measurement Timing Configuration (SMTC), cell reselection parameters such as threshold(s) and offset(s), etc.). This can be limited to cells that are neighbors, and hence possible candidates for cell reselection, and the satellite(s) serving these cells.

However, broadcasting up to date ephemeris data with full accuracy for multiple satellites will require that the satellite's gNB (which may be located on the ground, in the satellite or split between the two, depending on the network architecture) has to be kept updated with this information. This will require transfer of data between satellites, directly via inter-satellite links, or indirectly via nodes on the ground or transfer of data between gNBs associated with different satellites. Note also that except for the case of geostationary satellites, the neighboring satellites which are relevant for cell reselection keep changing (as do the satellite(s) which serve the gNB's own cell(s) in the transparent payload architecture case), so a gNB will have to be updated with ephemeris data of many more satellites than the number of satellites that are relevant for cell reselection at any one time.

According to certain embodiments, a way to reduce the required update frequency of other satellites' ephemeris data, as well as reducing the volume of the ephemeris data, is to only broadcast coarse ephemeris data about other satellites, while the ephemeris data with full accuracy is only broadcast by each satellite itself. The coarse ephemeris data of a neighbor satellite would be enough to enable a UE using directional reception (i.e. receive beamforming) to direct its receive beam accurately enough to capture the transmissions from the neighbor satellite. This allows the UE to synchronize with a cell served by that satellite and receive the broadcast full-accuracy ephemeris data, which in turn allows the UE to calculate a timing advance (TA) needed for a possible random access attempt.

In a particular embodiment, the coarse ephemeris data of another satellite may come in the form of truncated ephemeris parameters, where one or more of the least significant bits (LSBs) are omitted. This results in an inaccuracy range of each parameter and the UE should preferably assume a value in the middle of that range. As an illustrating hypothetical example, assume that a satellite broadcasts only the most significant bit (MSB) of a 4-bit ephemeris parameter associated with another satellite. If this bit is set to 0, the full 4-bit parameter may have either of the values in the range 0-7. If the bit is set to 1, the full 4-bit parameter may have either of the values in the range 8-15. However, the 4-bit parameter (representing some real-world measure) is in itself an approximation with a quantization error such as, for example, representing the real-world value V. In terms of the actual full-accuracy value (without quantization error), V, the 4-bit value could for instance represent the range 0-16. With this representation, the possible 4-bit values correspond to the real full-accuracy value V as follows:

| 4-bit value | V |
| --- | --- |
| 0000 | $0 \leq V < 1$ |
| 0001 | $1 \leq V < 2$ |
| 0010 | $2 \leq V < 3$ |
| 0011 | $3 \leq V < 4$ |
| 0100 | $4 \leq V < 5$ |
| 0101 | $5 \leq V < 6$ |
| 0110 | $6 \leq V < 7$ |
| 0111 | $7 \leq V < 8$ |
| 1000 | $8 \leq V < 9$ |
| 1001 | $9 \leq V < 10$ |
| 1010 | $10 \leq V < 11$ |
| 1011 | $11 \leq V < 12$ |
| 1100 | $12 \leq V < 13$ |
| 1101 | $13 \leq V < 14$ |
| 1110 | $14 \leq V < 15$ |
| 1111 | $15 \leq V < 16$ |

With this representation, the UE can assume, as an approximation, that if the broadcast MSB is set to 0, V is approximated to $(8-0)/2=4$. Similarly, if the broadcast MSB is set to 1, the UE can assume, as an approximation, that $V=8+(16-8)/2=12$. The truncated value should be enough for the UE to determine a good enough receive beam direction towards the concerned neighbor satellite. When/if the UE receives the remaining bits in a cell belonging to the concerned neighbor satellite, it will have the value with 4-bit accuracy (which, when combined with the UE's own location should be enough to support calculation of a TA to be used for uplink transmissions in the cell).

In another particular embodiment, an alternative way of shortening an ephemeris parameter and reducing its granularity is to use rounding, e.g. to the nearest $2^n$ multiple, e.g. the closest multiple of 32 (i.e. n=5). When broadcast, the rounded number would be divided by $2^n$, e.g. divided by 32, to make it shorter and the UE receiving the broadcast rounded value would do the reverse multiplication to arrive at the original rounded value. Then the UE can use this rounded value as an approximation of the full-accuracy value, which should be enough for the UE to determine a good enough receive beam direction towards the concerned neighbor satellite. When/if the UE receives the complete binary value (replacing the rounded value) in a cell belonging to the concerned neighbor satellite, this value should be accurate enough (when combined with the UE's own location) to support calculation of a TA to be used for uplink transmissions in the cell.

If ephemeris data is encoded using orbital state vectors, a satellite might use its own position as a reference location, and transmit only the position delta of the other satellites. Special Consideration of Cell Switches in the Earth-Fixed Cell Deployment Architecture In a particular embodiment, a serving gNB broadcasts (via a serving satellite in the transparent payload architecture case, where the gNB is located on the ground) ephemeris data such as, for example, in a coarse form, as described above, only for a satellite that will be serving a cell which is about to replace the current cell in the earth-fixed cell architecture (i.e. the ephemeris data is associated with the satellite that will serve the cell that is about to take over the coverage of the current cell's geographical area).

In another embodiment, a serving gNB broadcasts (via a serving satellite in the transparent payload architecture case, where the gNB is located on the ground) ephemeris data such as, for example, in a coarse form, as described above, for a satellite that will serve a cell which is about to replace the current cell in the earth-fixed cell architecture (i.e. the ephemeris data is associated with the satellite that will serve the cell that is about to take over the coverage of the current cell's geographical area) in addition to ephemeris data associated with satellite(s) serving any other neighbor cell(s).

As another variation of the two above embodiments, the serving satellite broadcasts the full ephemeris data associated with the satellite that will serve the cell that is about to replace the current cell in the earth-fixed cell architecture (i.e. the cell that is about to take over the coverage of the current cell's geographical area). In a further particular embodiment, this full ephemeris data is broadcast in addition to coarse ephemeris data pertaining to satellite(s) serving other neighbor cell(s). In still another particular embodiment, this full ephemeris data is the only ephemeris data the satellite broadcasts (except for its own ephemeris data).

In any of these embodiments described herein, the (full and/or coarse) ephemeris data associated with the satellite that will serve the cell that is about to replace the current cell in the earth-fixed cell architecture may be broadcast only temporarily during a time period close to the coming satellite/cell switch. Or, alternatively, this ephemeris data is periodically broadcast all the time, but the frequency of the broadcasts is increased during a time period close to the coming satellite/cell switch. Methods enabling temporary periods of more frequent broadcast of (selected parts of) the SI, or temporary periods during which selected parts of the SI are broadcast, where these SI parts are otherwise not broadcast at all, have been previously considered.

Utilization of SI Broadcast Request (SI On-Demand)

In a particular embodiment, no ephemeris data associated with other satellites is periodically broadcast in a serving cell. Rather, the ephemeris data associated with other satellites is only available on-demand (e.g. using Msg1 based or Msg3 based SI request). For example, in a particular embodiment, a UE can request the coarse ephemeris data of another satellite (e.g. by requesting the coarse ephemeris data that is relevant for a certain neighbor cell). In another particular embodiment, a UE can request the full ephemeris data of another satellite (e.g. by requesting the full ephemeris data that is relevant for a certain neighbor cell).

In still another embodiment, a gNB/satellite periodically broadcasts coarse ephemeris data of satellite(s) serving neighbor cell(s), but a UE may request the full ephemeris data of any of these satellites, e.g. using Msg1 based or Msg3 based SI request.

In all the above embodiments and any variations thereof, either Msg1 based or Msg3 based SI request may be used. When Msg1 based SI request is used, a set of RA preambles may be configured to each be used for request of ephemeris data for one or more satellites. For example, in a particular embodiment, a single RA preamble is used for request of ephemeris data for all the satellites serving neighbor cells. When Msg3 based SI request is used, a UE can specify in Msg3 which neighbor cell's or neighbor cells' satellite(s) it requests ephemeris data for.

The embodiments described herein may be useful for UEs in RRC_IDLE or RRC_INACTIVE state.

Figure 3:
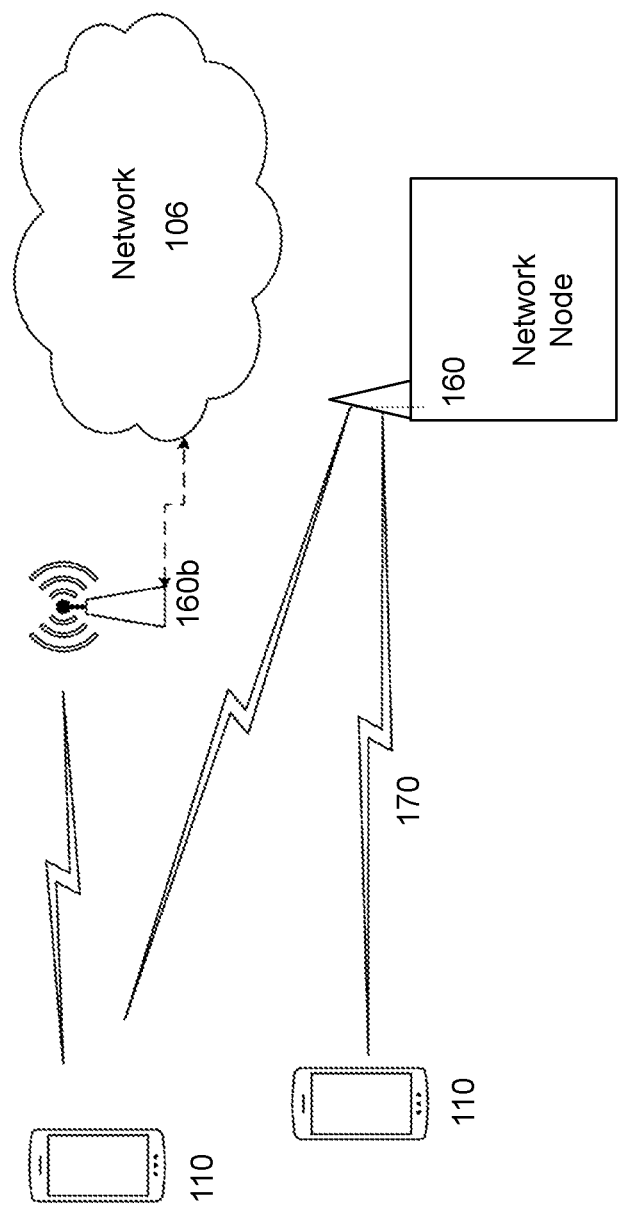
FIG. 3 illustrates an example wireless network, according to certain embodiments.

FIG. 3 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160*b*, and wireless devices (WDs) 110. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
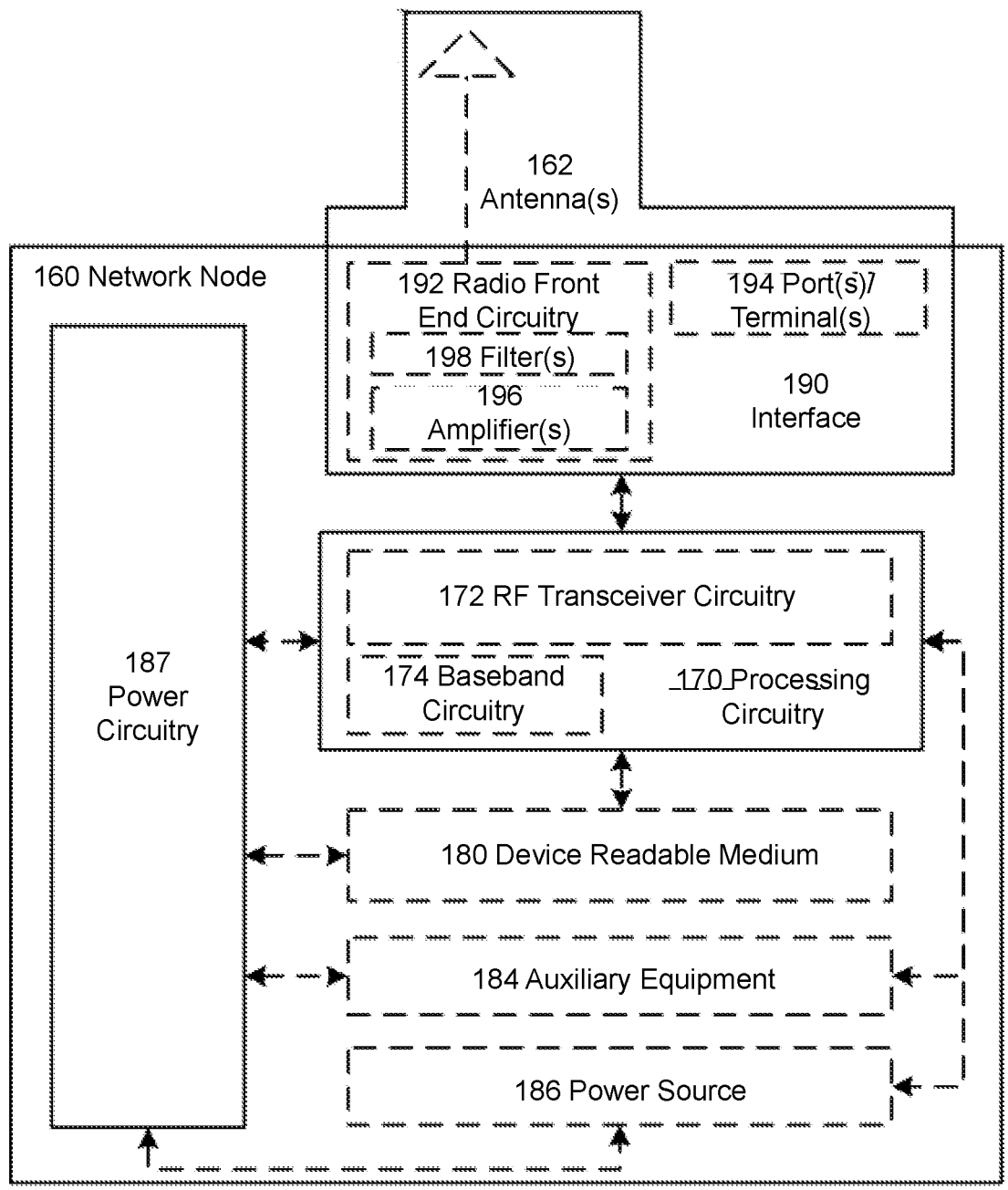
FIG. 4 illustrates an example network node, according to certain embodiments.

FIG. 4 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs)(e.g., radio access points), base stations (BSs)(e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Network node 160 may be an NTN network node. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 5:
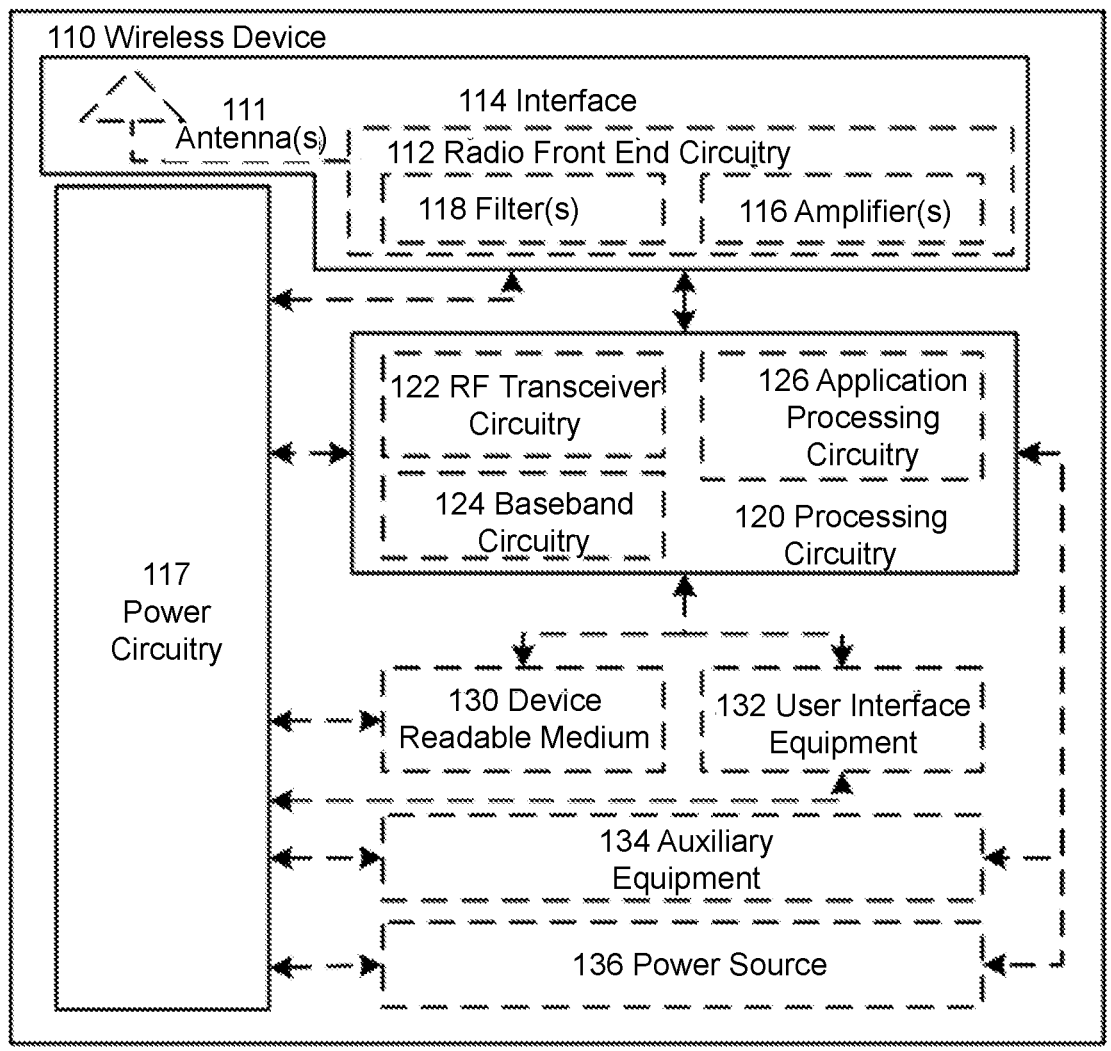
FIG. 5 illustrates an example wireless device, according to certain embodiments.

FIG. 5 illustrates an example WD 110, according to certain embodiments. As used herein, WD refers to a device capable, configured, arranged and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 6:
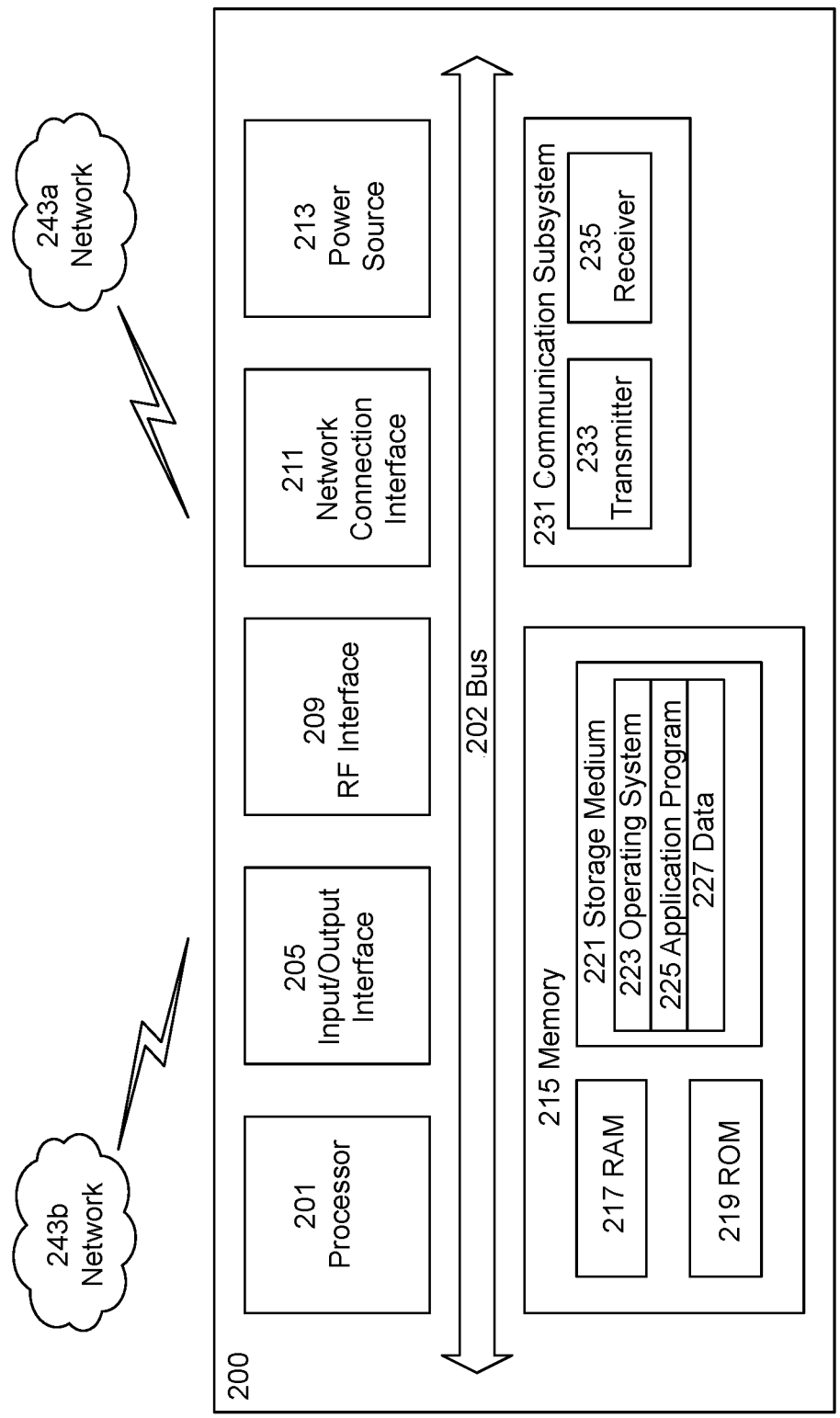
FIG. 6 illustrate an example user equipment, according to certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
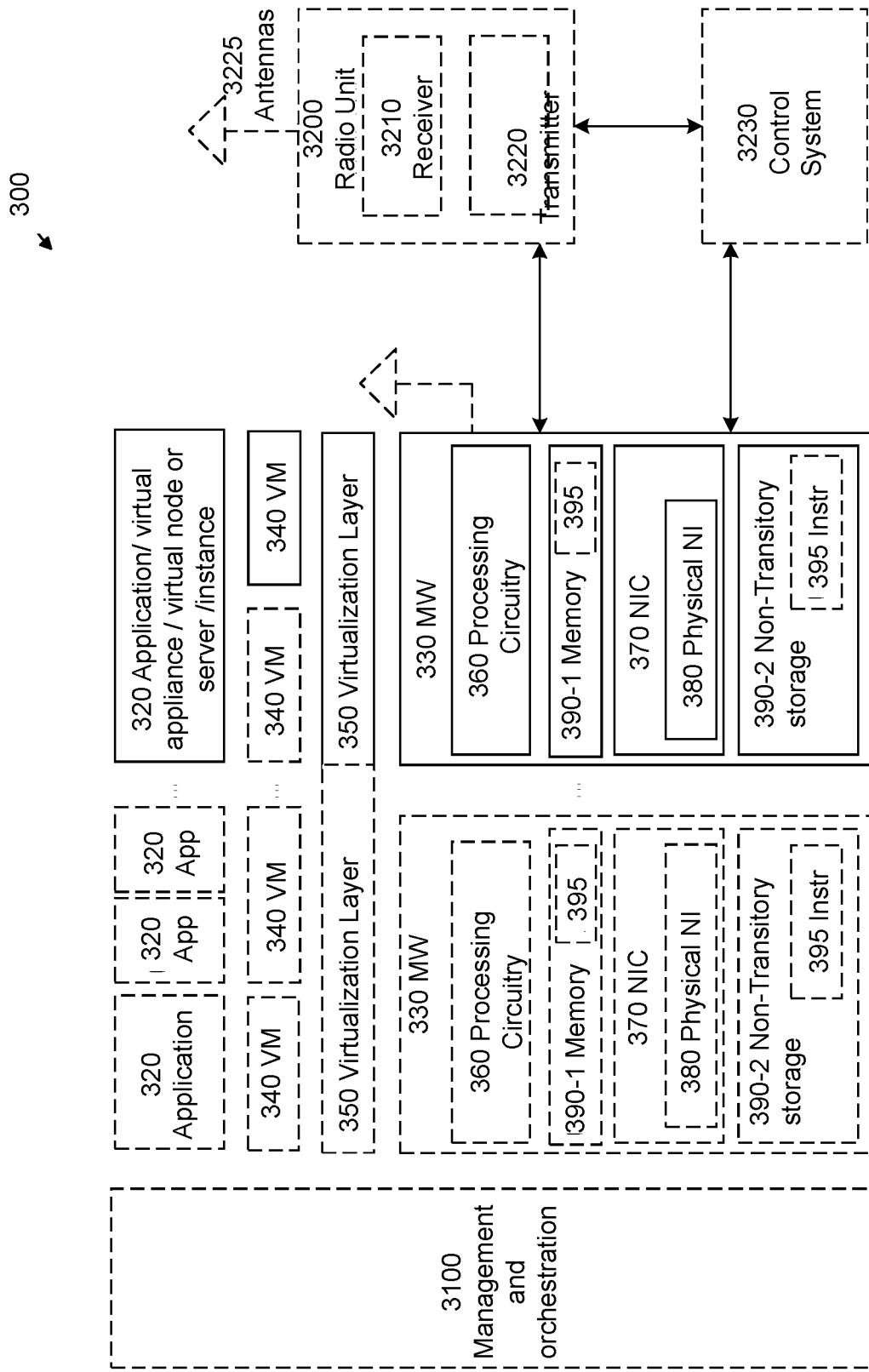
FIG. 7 illustrates a virtualization environment in which functions implemented by some embodiments may be virtualized, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

FIG. 7 illustrates a telecommunication network connected via an intermediate network to a host computer in accordance with some embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 9:
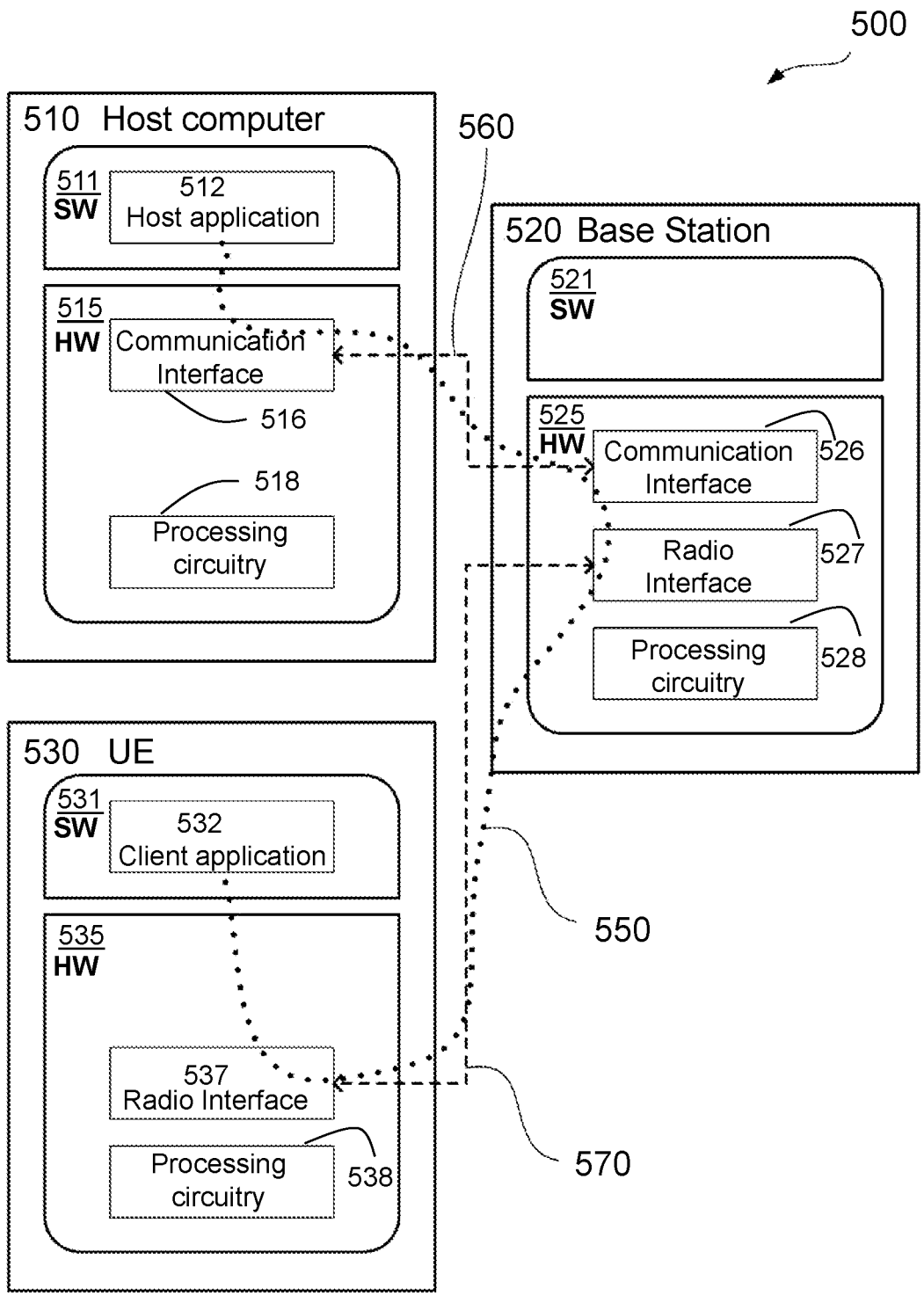
FIG. 9 illustrates a generalized block diagram of a host computer communicating via a base station with a user equipment over a partially wireless connection, according to certain embodiments.

FIG. 9 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be director it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 9 may be similar or identical to host computer 430, one of base stations 412a, 412b, 412c and one of UEs 491, 492 of FIG. 7, respectively. This is to say, the inner workings of these entities may be as shown in FIG. 9 and independently, the surrounding network topology may be that of FIG. 7.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the efficiency with which a UE is able to find and synchronize with a NTN cell and thereby provide benefits such as improved battery life, fewer gaps in coverage, smoother handovers, etc.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 8:
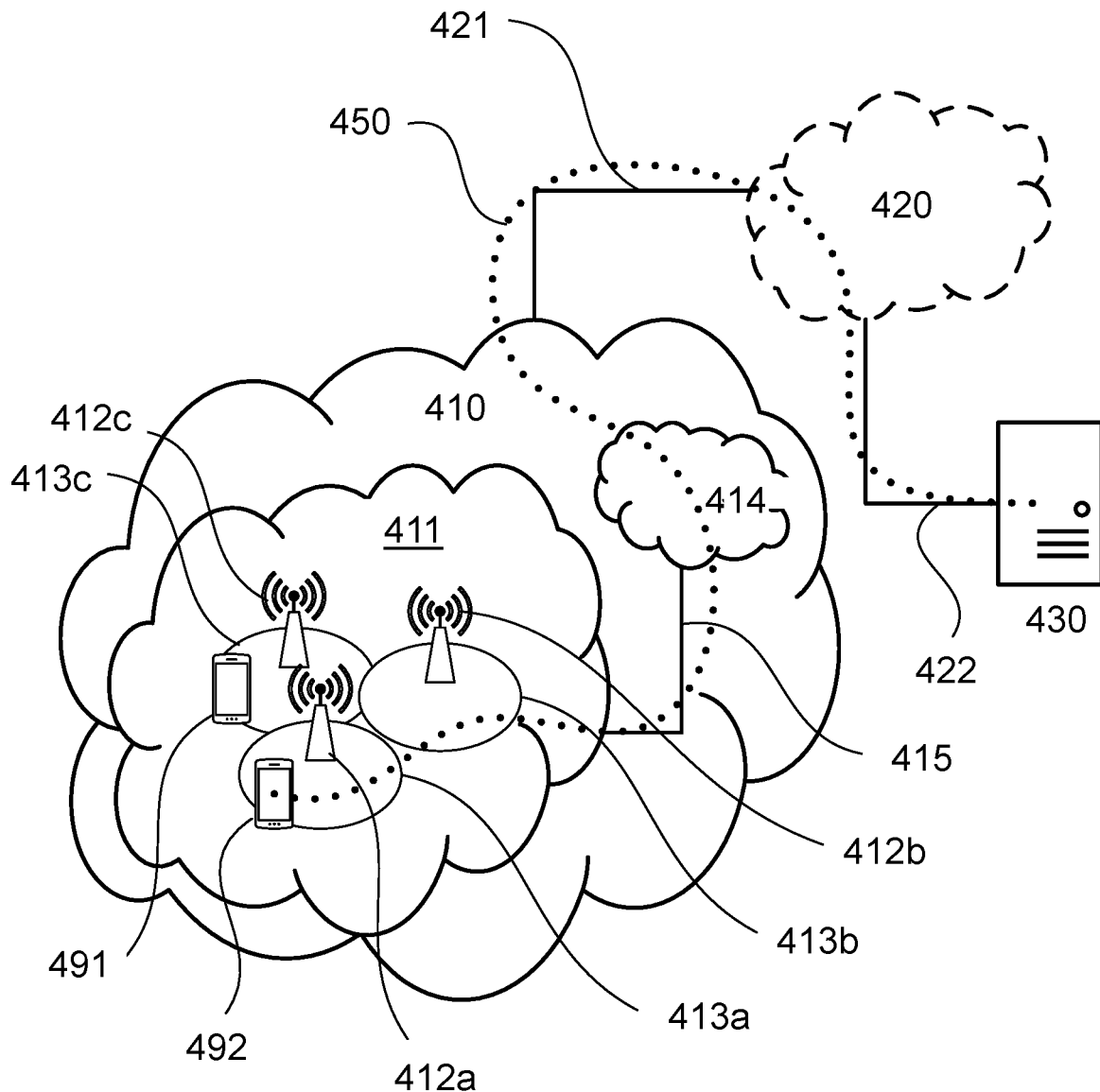
FIG. 8 illustrates a telecommunication network connected via an intermediate network to a host computer, according to certain embodiments.
Figures 10, 11:
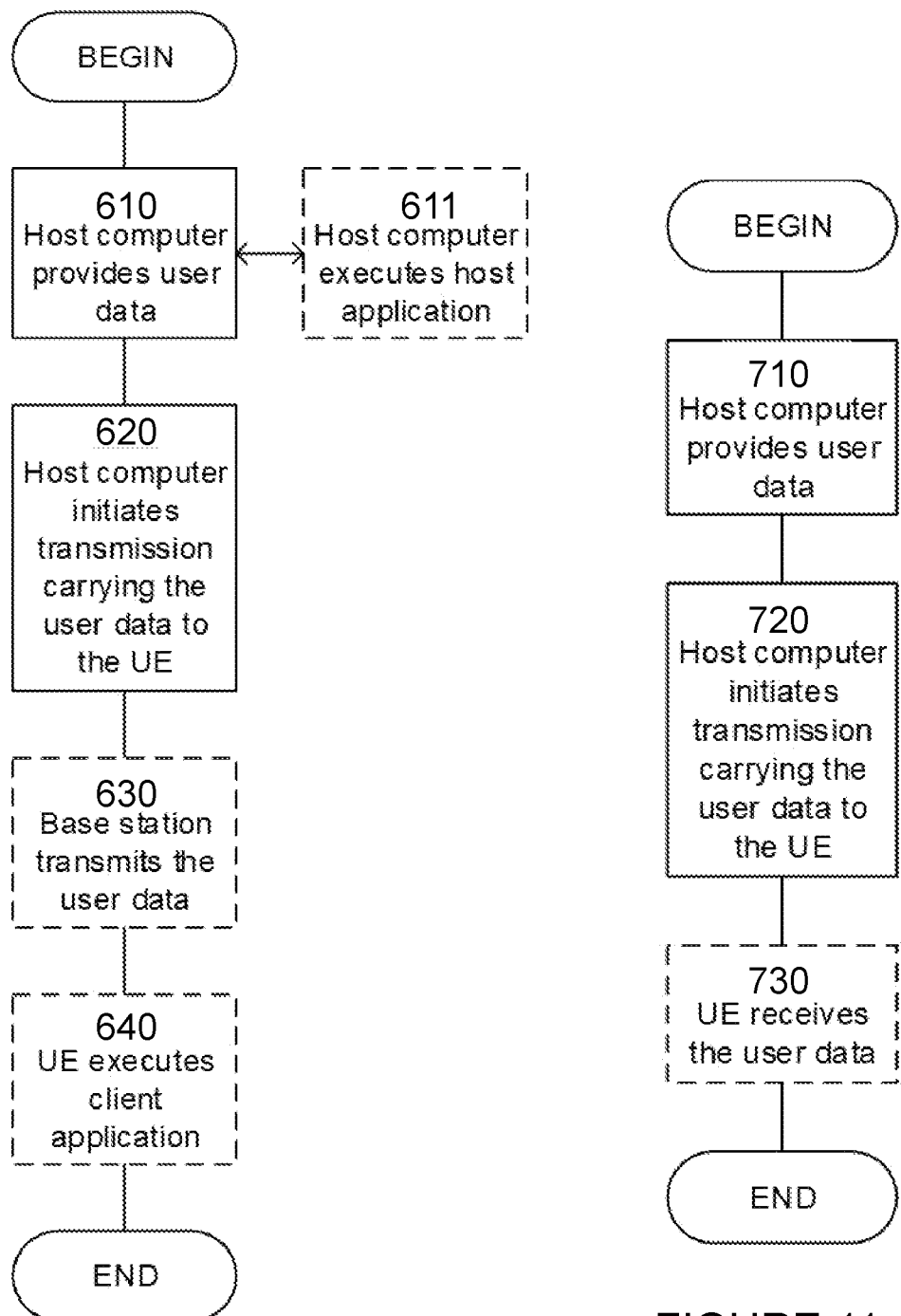
FIG. 10 illustrates a method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 12, 13:
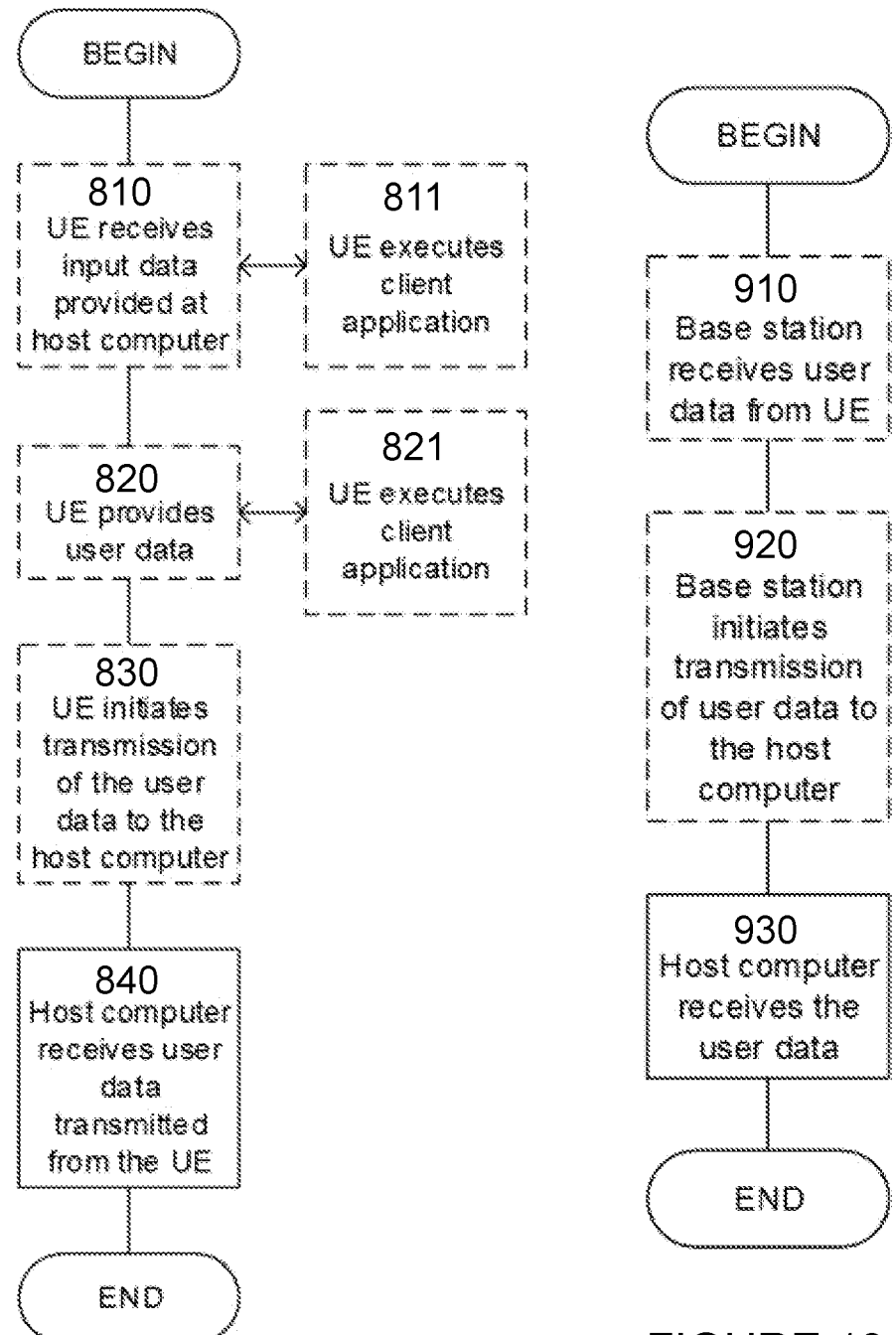
FIG. 12 illustrates another method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 14:
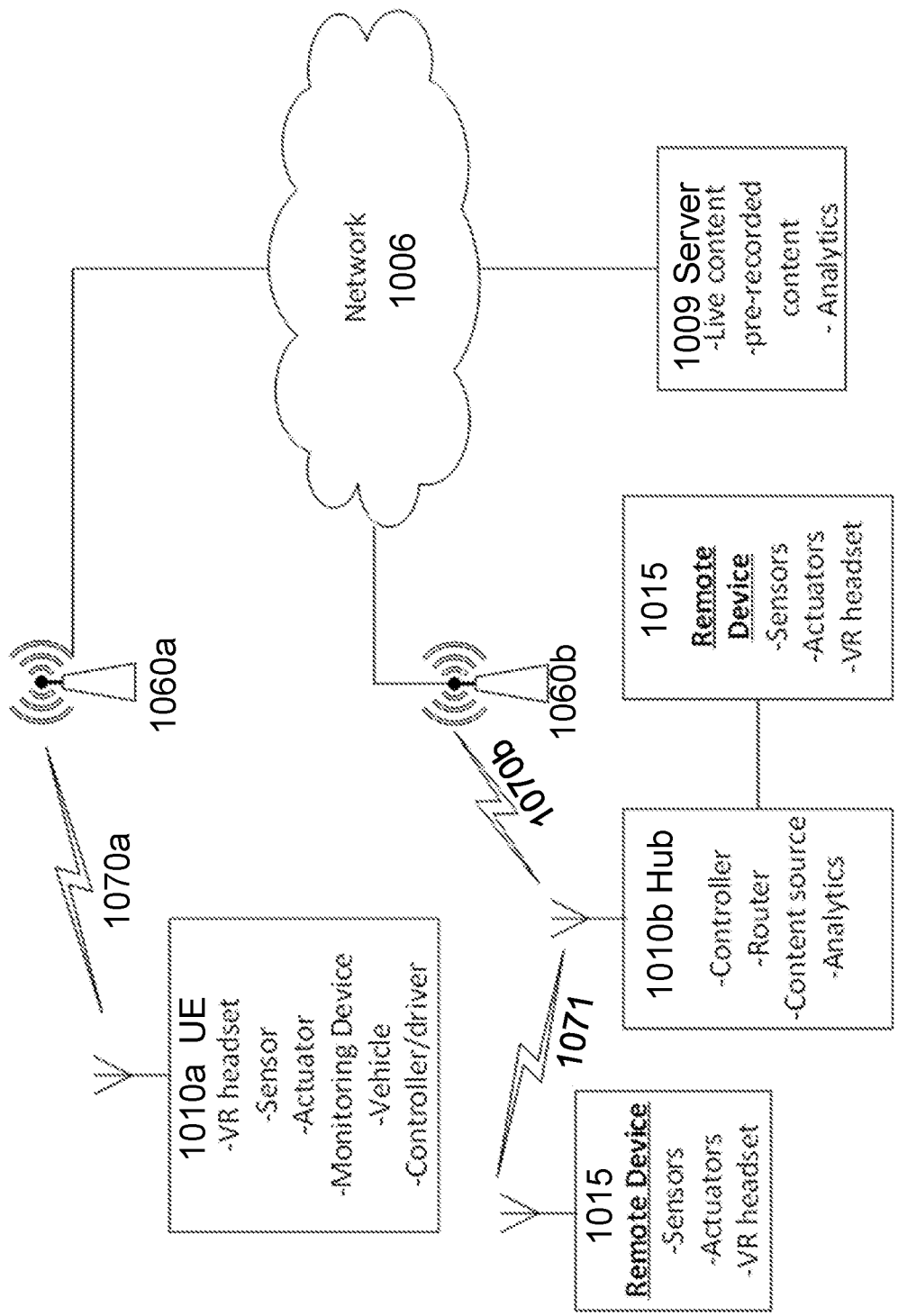
FIG. 14 illustrates another example wireless network, according to certain embodiments.

FIG. 14 depicts a wireless network comprising different devices connected, either directly or indirectly, to the wireless network through one or more access network nodes, such as gNBs 1060a and 1060b. In particular, the wireless network includes access network nodes such as gNBs 1060a and 1060b, UE 1010a, hub 1010b, remote devices 1015a and 1015b and server 1009. UE 1010a and hub 1010b may be any of a wide variety of devices capable of communicating wirelessly with gNBs 1060's. Although hub 1010b is referred to as a hub, it may also be considered a UE (with hub functionality) because it is able to communicate wirelessly with gNB 1060b using a standard protocol, for example a wireless standard such as one provided by 3GPP. In fact, each of the devices illustrated in FIG. 14 represent a wide variety of different devices that can be used in different scenarios as discussed in more detail below. Any of these devices which are able to communicate wirelessly with a gNB, eNB or any other similar 3GPP access node may be considered a wireless device or UE.

Looking now at some of the possibilities, UE 1010a may be any of a variety of different devices that are able to wirelessly communicate with gNB 1060a. Some examples, which are listed in FIG. 14, include a virtual reality (VR) headset, a sensor, an actuator, a monitoring device, a vehicle, or a remote controller. These examples are not exhaustive and include therein a wide variety of more specific devices, including a wide range of Internet of Things (IoT) devices. For example, in embodiments where UE 1010*a* is a VR headset, UE 1010*a* may be a cell phone that is used with a head mount or it may be a standalone or dedicated VR headset. In some embodiments UE 1010*a* may be an augmented reality (AR) headset. As an AR or VR headset UE 1010*a* may be used for entertainment (e.g., gaming, videos, etc.), education/business (e.g., remote conferences, virtual lectures, etc.), medical (e.g., remote diagnostic, patient consultation, etc.), or any other use in which virtual or augmented content may be provided to a remote user. In any of these cases UE 1010*a* may be receiving content via wireless connection 1070*a* with gNB 1060*a*.

As another example, in embodiments where UE 1010*a* is a sensor or monitoring device, UE 1010*a* may be a motion, gravitational, moisture, temperature, biometric, speed, door/window open, smoke, fire, volume, flow, or any other type of device that is able to detect or measure one or more conditions. As a sensor UE 1010*a* may also be able to capture conditions. For example, UE 1010*a* may capture images if it comprises a camera or sound if it comprises a microphone. Regardless of the type of sensor, UE 1010*a* may provide an output via wireless connection 1070*a* to gNB 1060*a*. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, in embodiments where UE 1010*a* is an actuator, UE 1010*a* may be a motor, switch, or any other device that may change states in response to receiving an input via wireless connection 1070*a*. For example, UE 1000*a* may be a vibrator that creates vibration to provide a user with haptic feedback. As another example UE 1000*a* may be a small motor that adjusts the control surfaces of a drone in flight or to a robotic arm performing a medical procedure. As another example, UE 1000*a* may be a switch that remotely turns on another device, such as a light.

As another example, in embodiments where UE 1010*a* is a vehicle, UE 1010*a* may be a drone, car, plane, ship, train, tractor, robot, or any other type of device comprising one or more sensors and/or actuators that may change its locations whether autonomously or at the direction of a user. In such embodiments where UE 1010*a* is a remotely controlled vehicle, such as a drone, it may receive instructions on movement, actuating, or sensing from a user via wireless connection 1070*a* and provide location, sensor or video information back to the user via wireless connection 1070*a*. In such embodiments where UE 1010*a* is an autonomous vehicle it may receive alerts and other messages from other vehicles and/or infrastructure sensors via wireless connection 1070*a* as well provide its own telemetry data to others via wireless connection 1070*a*.

As another example, in embodiments where UE 1010*a* is a remote control, UE 1010*a* may be a device dedicated to controlling other devices or a general purpose computer with a program or application that provides control of other devices. UE 1010*a* may send commands to a remote device via wireless connection 1070*a*. UE 1010*a* may also receive feedback, telemetry, or other information from the remote device via wireless connection 1070*a*. UE 1010*a* may present this received information to a user who may then issue commands for the remote device. For example, UE 1010*a* may receive via wireless connection 1070*a* a video signal from a remote surgical room and then issue commands via wireless connection 1070*a* to a remote surgical machine that can execute the commands.

While only a single UE 1010*a* is illustrated in FIG. 14, in practice any number of UEs may be used together with respect to a single use case. For example, a first UE 1010*a* may be a speed sensor used in a drone which provides the drone's speed information to a second UE 1010*a* that is a remote control operating the drone. When the user makes changes from the remote control, a third UE 1010*a* that is an actuator may adjust a throttle on the drone to increase or decrease the speed. Similarly, in the example above, the first (sensor) and third (actuator) UE 1010*a*'s may be a single UE that handles communication for both the speed sensor and the actuators or UE QQA 110*a* may comprise one or more of the above. Similarly, in the example above, a hub, such as hub 1010*b*, may be used to handle communication between the sensors and actuators and the controller.

Hub 1010*b* may be any of a variety of different devices that provides wireless access to gNB 1060*b* for one or more remote devices 1015*a*. Some examples of different types of hubs are listed in Figure QAA and include a controller, router, content source and analytics. Hub 1010*b* may include memory to store data (e.g., video, audio, images, buffer, sensor data, file share) that is collected from, or is to be provided to, remote device 1015*a*. Hub 1010*b* hub may include a processor, operating system, and server functionality. Hub 1010*b* may include components for wireless communication to enable wireless connection 1071 to remote device 1015*a* and/or components for a fixed connection to remote device 1015*b*. Hub 1010*b* may also include routing capabilities, firewall capabilities, a VPN-server or VPN-client. Hub 1010*b* may also allow for a different communication scheme and/or schedule between hub 1010*b* and remote devices 1015 and between hub 1010*b* and network 1006.

As one example, hub 1010*b* may be a broadband router enabling direct or indirect access to network 1006 for remote device 1015*a*. In certain embodiments, hub 1010*b* may facilitate communication between remote devices 1015*a* and 1015*b*. This may be done with, or without, the communications passing through network 1006. In some embodiments, hub 1010*b* may simply forward the data from remote device 1015*a* or 1015*b* to network 1006. In some embodiments, hub 1010*b* may first filter, buffer, store, analyze or collate the data from remote device 1015*a* or 1015*b* before sending on the data to network 1006 or another remote device. Similarly, the data from network 1006 may pass directly through hub 1010*b* or it may first be processed by hub 1010*b* on the way to remote device 1015*a* or 1015*b*.

As another example, hub 1010*b* may be a controller that sends commands or instructions to one or more actuators in remote device 1015*a*. The commands or instructions may be received from a second remote device 1015*b*, from gNB 1060*b* or by executable code, script or process instructions in hub 1010*b*.

As another example, hub 1010*b* may be a collection place for data from one or more remote devices 1015*a* and/or 1015*b*. For example, remote devices 1015*a* and/or 1015*b* may be a sensor, a camera, measurement equipment, or any other type of device discussed herein that may provide output or receive input. Hub 1010*b* may act as a temporary storage for data from, for example remote device 1015*b* and, in some embodiments, may perform analysis, or other processing on the data. Hub 1010*b* may have a constant/persistent or intermittent connection to gNB 1060*b*.

As another example, hub 1010*b* may be a content source. For example, when remote device 1015*a* is a VR headset, display, loudspeaker or other media delivery device, hub 1010*b* may retrieve VR assets, video, audio, or other media via gNB 1060*b* which it then provides to remote device 1015*a* either directly, after some local processing, and/or after adding additional local content.

Remote device 1015*a* may be any of a variety of different devices, for example, remote device 1015*a* may be a device comprising one or more of sensors, actuators, and/or a screen. Remote device 1015*a* may alternatively be a VR (or AR) headset, a Machine-2-Machine (M2M) device, an IoT device, an internet of Everything (IoE) device, or any other type of device which is capable of accessing a communication network wirelessly via a hub or a device capable of acting as a hub, which in the present context comprise providing network access to a device which is not able to communicate directly with communication network 1006 via gNB 1060*a* or 1060*b*. In some scenarios, remote device 1015*a* may be able to establish a wireless connection with gNB 1060*a* or 1060*b* yet nonetheless still connects via hub QQA 110*b*. Remote device 1015*b* may be similar to remote device 1015*a* in most respects except that it has a wired connection to hub 1010*b* rather than a wireless connection, such as wireless connection 1071.

gNBs 1060*a* and 1060*b* may provide various wireless devices such as UE 1010*a* and hub 1010*b* with wireless access to network 1006. Network 1006 may connect the various devices illustrated in FIG. 14 including server 1009 which may host a variety of applications such as live and pre-recorded content, data collection services such as retrieving and compiling data on various ambient conditions detected by a plurality of remote devices 1015*a*, 1015*b* or UE 1010*a*, analytics functionality, social media, functions for controlling or otherwise interacting with remote devices, functions for an alarm and surveillance center, or any other such function done by a server. For example, factory status information may be collected and analyzed by server 1009. As another example, server 1009 may process audio and video data which may have been retrieved from UE 1010*a* for use in creating maps. As another example, server 1009 may collect and analyze real-time data to assist in controlling vehicle congestion (e.g., controlling traffic lights). As another example, server 1009 may store surveillance video uploaded by remote device 1015*b* via hub 1010*b*. As another example, server 1009 may store media content such as video, audio, VR, or AR which it can broadcast, multicast or unicast to remote devices such as UE 1010*a* or remote device 1015*a*. As other examples, server 1009 may be used for energy pricing, for remote control of non-time critical electrical load to balance power generation needs, location services, presentation services (such as compiling diagrams etc. from data collected from remote devices), or any other function of collecting, retrieving, storing, analyzing and/or transmitting data.

Figure 15:
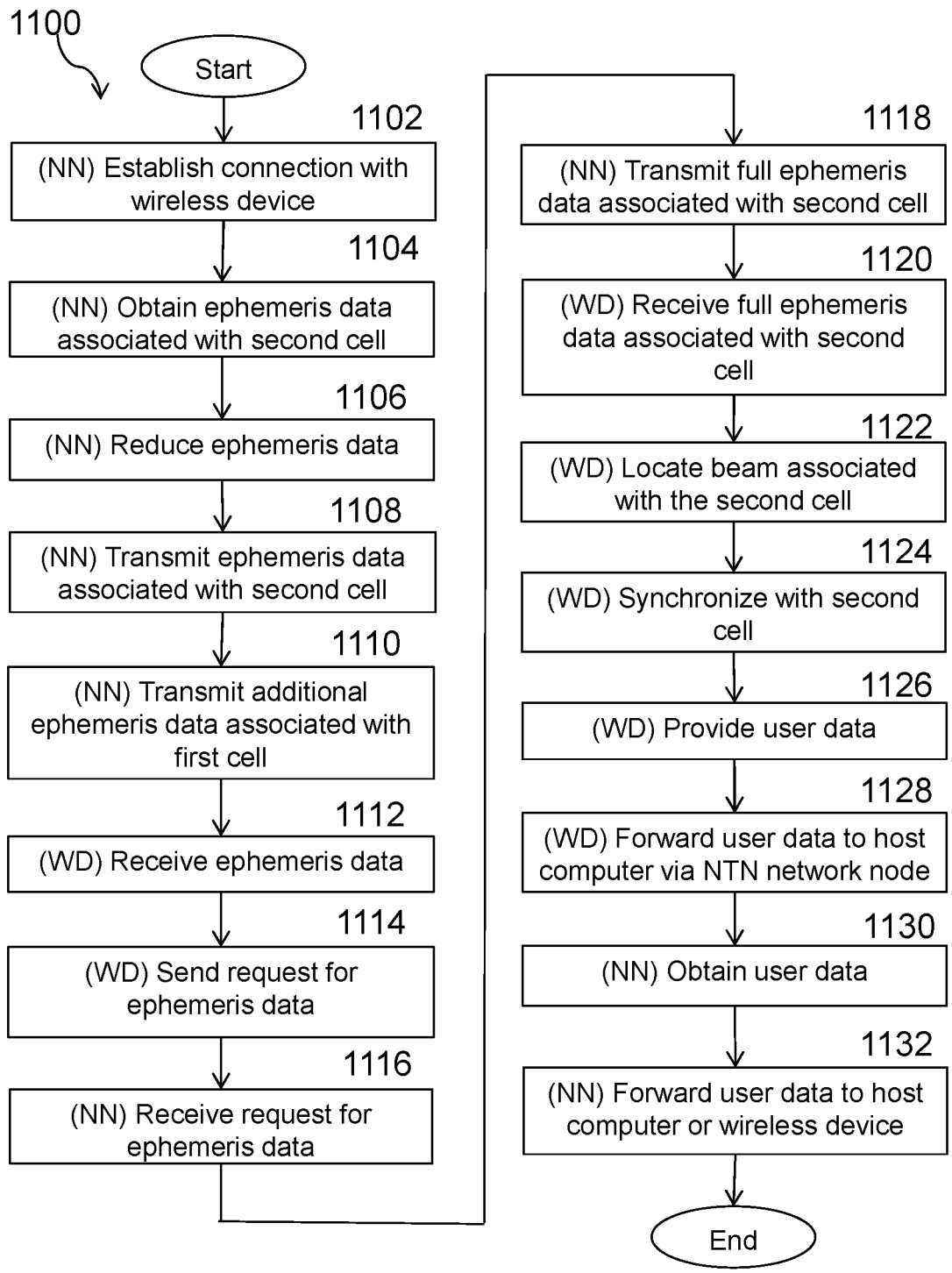
FIG. 15 illustrates an example method in accordance with particular embodiments.

FIG. 15 illustrates an example method 1100 in accordance with particular embodiments. For purposes of simplifying the above flow chart, steps performed by both a NTN network node and a wireless device are depicted. In practice, a wireless device may only perform the steps marked as (WD) and a NTN network node may only perform the steps marked as (NN). The method begins at step 1102 with the wireless device and network node establishing a wireless connection. The network node may be associated with a first cell.

At step 1104 the network node obtains ephemeris data associated with a second cell. The ephemeris data may be obtained from a network node associated with the second cell. In some embodiments or scenarios, the second cell may be a neighbour cell of the first cell. In some embodiments or scenarios, the second cell will replace the first cell. For example, due to the orbital movement of the NTN network nodes of the first and second cell, over time the cell may change as the nodes move in and out of coverage.

At step 1106 the network node reduces the ephemeris data. Once reduced the ephemeris data may be considered rough ephemeris data comprising less than complete ephemeris data that was obtained from the network node. In some embodiments the ephemeris data may be reduced by the network node removing one or more of the least significant bits from one or more values of the complete ephemeris data. In some embodiments the ephemeris data may be reduced by rounding one or more values of the complete ephemeris data. For example, the values may be rounded to the nearest 2 multiple, e.g. the closest multiple of 32 (i.e. n=5). In some embodiments the ephemeris data may be reduced by expressing the data as a delta in the ephemeris data of the first cell.

At step 1108 the network node transmits the reduced ephemeris data associated with the second cell. This may be transmitted on a periodic basis. In some embodiments the periodicity may change depending on how close or far away the second cell is from replacing the first cell. In some embodiments, the network node may transmit the ephemeris data with system information.

At step 1110 the network node transmits additional ephemeris data associated with its own first cell. In some embodiments, the network node may transmit additional ephemeris data associated with other cells, such as neighbouring cells.

At step 1112 the wireless device receives the ephemeris data (both the data associated with the first cell and the second cell). The data may be received together or in separate transmissions.

At step 1114 the wireless device sends a request for more complete ephemeris data. This is received by the network node at step 1116. In some embodiments, the wireless device may send a request before the network node will send any ephemeris data, including the ephemeris data that it sent at step 1108 in this method.

At step 1118 the network node transmits the full ephemeris data associated with the second cell. In some embodiments, the full ephemeris data may be transmitted by a network node of the second cell. For example, after the wireless device synchronizes with the second cell using the rough ephemeris data received from the first cell, the full ephemeris data may be transmitted by the second cell.

At step 1120 the wireless device receives the full ephemeris data associated with second cell.

At step 1122 the wireless device locates one or more beams associated with the second cell. The wireless device will be able to direct its antenna in a direction based on the data. The accuracy of the direction of the antenna may vary depending on the amount of detail in the received ephemeris data (e.g., complete data will allow more accurate beam locating than rough ephemeris data).

At step 1124 the wireless device synchronizes with the second cell.

At step 1126, after completing the handover to the second cell the wireless device provides user data. At step 1128 the wireless device forwards the user data to a host computer via network node associated with the second cell. At step 1130 the network node obtains the user data. At step 1132 the network node then forwards the user data to the host computer. User data can also flow in the opposite direction in which the network node obtains user data and then forwards the data to the wireless device.

Figure 16:
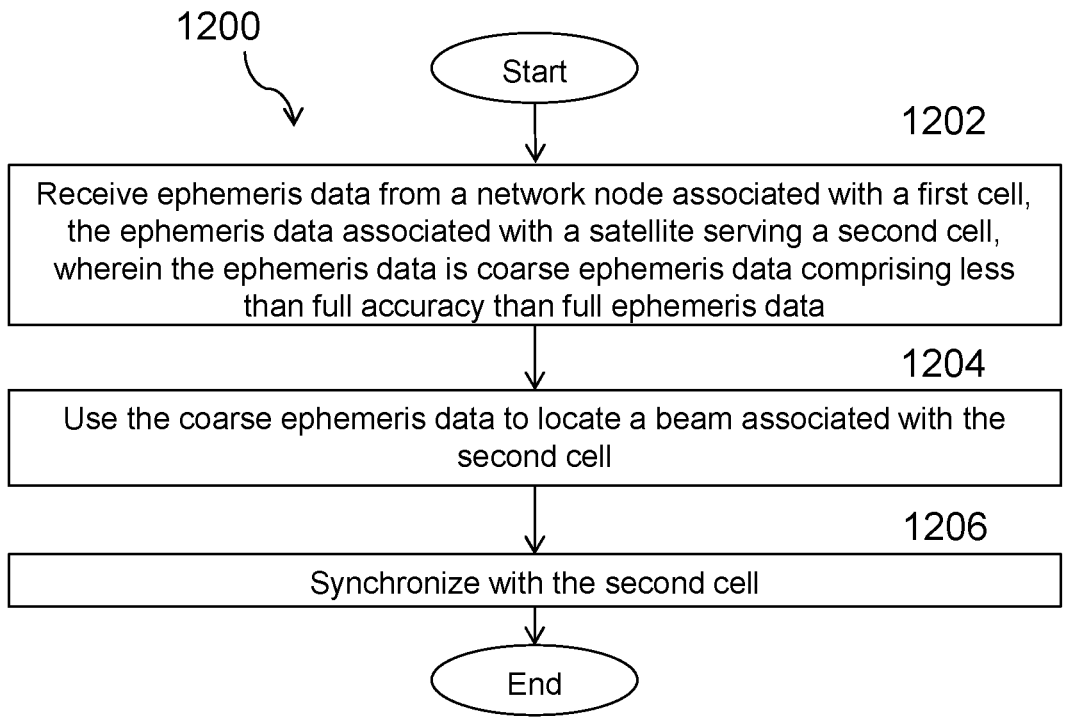
FIG. 16 illustrates an example method by a wireless device, according to certain embodiments.

FIG. 16 illustrates a method 1200 by a wireless device 110, according to certain embodiments. As illustrated the method begins when wireless device 110 receives ephemeris data from a network node 160 associated with a first cell, at step 1202. The ephemeris data associated with a satellite serving a second cell, and the ephemeris data is coarse ephemeris data comprising less than full accuracy than full ephemeris data. At step 1204, the wireless device 110 uses the coarse ephemeris data to locate a beam associated with the second cell. At step 1206, the wireless device 110 synchronizes with the second cell.

In a particular embodiment, the coarse ephemeris data includes data in which the full ephemeris data is reduced by the network node using at least one of the following: removing one or more of the least significant bits of the full ephemeris data; or rounding the full ephemeris data.

In a particular embodiment, the coarse ephemeris data comprises delta information relative to full ephemeris data associated with the first or the second cell.

In a particular embodiment, the wireless device 110 receives full ephemeris data associated with the second cell, and the full ephemeris data includes additional data not contained in the coarse ephemeris data. In a further particular embodiment, the full ephemeris data associated with the second cell is received from the satellite serving the second cell. In a further particular embodiment, the full ephemeris data associated with the second cell is received from the network node serving the first cell.

In a further particular embodiment, the wireless device 110 sends a request for the full ephemeris data associated with the second cell. In a further particular embodiment, the request is made for the full ephemeris data associated with the second cell and is sent after receiving the course ephemeris data associated with the second cell.

In a particular embodiment, the ephemeris data is received periodically according to a periodicity. In a further particular embodiment, the periodicity increases such that the ephemeris data is broadcast more often as a distance between the wireless device and the satellite serving the second cell decreases.

In a particular embodiment, the ephemeris data includes additional ephemeris data associated with at least a third cell other than the second cell.

In a particular embodiment, the ephemeris data is received with system information.

Figure 17:
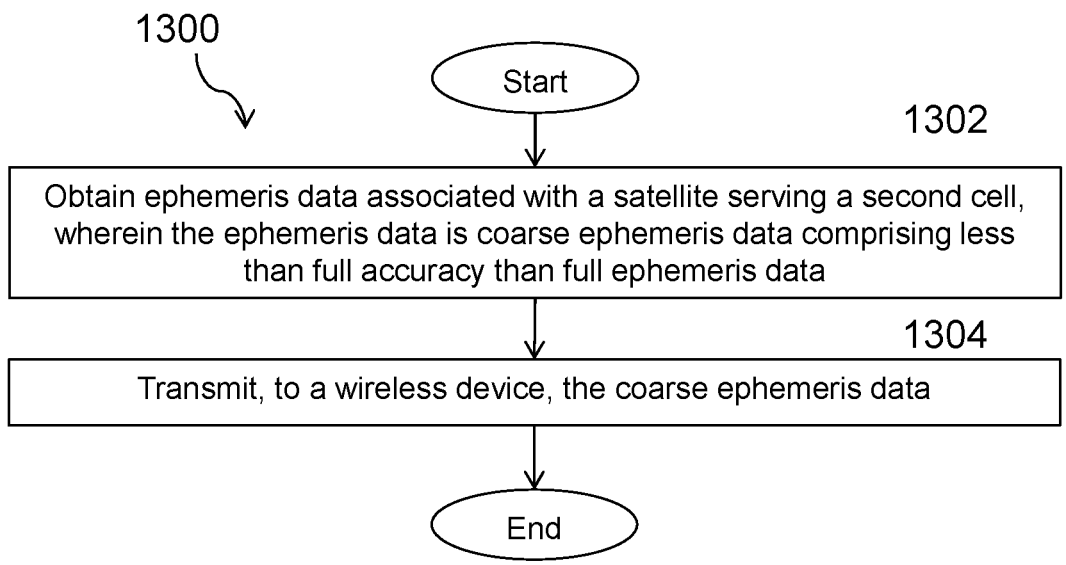
FIG. 17 illustrates an example method by a NTN node serving a wireless device in a first cell, according to certain embodiments.

FIG. 17 illustrates a method 1300 performed by a network node 160 serving a wireless device 110 in a first cell, according to certain embodiments. The method begins at step 1302 when the network node 160 obtains ephemeris data associated with a satellite serving a second cell. The ephemeris data is coarse ephemeris data comprising less than full accuracy than full ephemeris data. At step 1304, the network node 160 transmits, to the wireless device 110, the coarse ephemeris data.

In a particular embodiment, network node 160 transmits additional ephemeris data associated with the first cell.

In a particular embodiment, the second cell is a neighbor cell.

In a particular embodiment, the second cell will replace the first cell.

In a particular embodiment, the coarse ephemeris data includes data in which the full ephemeris data is reduced using at least one of the following: removing one or more of the least significant bits of the full ephemeris data; and rounding the full ephemeris data.

In a particular embodiment, the coarse ephemeris data comprises delta information for the second cell relative to the full ephemeris data associated with the first or the second cell.

In a particular embodiment, the network node 160 transmits full ephemeris data associated with the second cell, and the full ephemeris data includes additional data not contained in the coarse ephemeris data.

In a particular embodiment, the network node 160 receives a request from the wireless device 110 for ephemeris data. In a further particular embodiment, the request is made for the full ephemeris data and is received after transmitting the coarse ephemeris data.

In a particular embodiment, the ephemeris data is transmitted periodically according to a periodicity. In a further particular embodiment, the periodicity increases such that the ephemeris data is transmitted more often as a distance between the wireless device and the satellite serving the second cell decreases.

In a particular embodiment, the ephemeris data comprises additional ephemeris data associated with at least a third cell other than the second cell.

In a particular embodiment, the ephemeris data is transmitted with system information.

Example Embodiment

Example Embodiment 1. A method performed by a wireless device, the method comprising: receiving ephemeris data from a first cell, the ephemeris data associated with a second cell; using the ephemeris data to locate a beam associated with the second cell; and synchronizing with the second cell.

Example Embodiment 2. The method of Example Embodiment 1, wherein the ephemeris data is rough ephemeris data comprising less than complete ephemeris data.

Example Embodiment 3. The method of Example Embodiment 2, wherein the rough ephemeris data comprises data in which the complete ephemeris data is reduced using at least one of the following: removing one or more of the least significant bits of the complete ephemeris data; or rounding the complete ephemeris data.

Example Embodiment 4. The method of Example Embodiment 2, wherein the rough ephemeris data comprises delta information relative complete ephemeris data associated with the first cell.

Example Embodiment 5. The method of Example Embodiment 2, further comprising receiving full ephemeris data associated with the second cell, the full ephemeris data comprising additional data not contained in the rough ephemeris data.

Example Embodiment 6. The method of Example Embodiment 5, wherein the full ephemeris data is received from the second cell.

Example Embodiment 7. The method of Example Embodiment 5, wherein the full ephemeris data is received from the first cell.

Example Embodiment 8. The method of any of Example Embodiments 1-7 further comprising sending a request for the ephemeris data.

Example Embodiment 9. The method of Example Embodiment 8, wherein the request is made for the full ephemeris data and is sent after receiving the rough ephemeris data.

Example Embodiment 10. The method of any of Example Embodiments 1-9 wherein the ephemeris data is received periodically.

Example Embodiment 11. The method of Example Embodiment 10, wherein the periodicity changes over time such that it is broadcast more often the closer in time the second cell is to replacing the first cell.

Example Embodiment 12. The method of any of Example Embodiments 1-11, wherein the ephemeris data comprises ephemeris data associated with at least a third cell in addition to the second cell.

Example Embodiment 13. The method of any of Example Embodiments 1-12, wherein the ephemeris data is received with system information.

Example Embodiment 14. The method of any of the previous embodiments, further comprising: providing user data; and forwarding the user data to a host computer via the transmission to the base station.

Example Embodiment 15. A method performed by an NTN network node, the method comprising: establishing a connection with a wireless device, the connection associated with a first cell; obtaining first ephemeris data associated with a second cell; and transmitting to the wireless device second ephemeris data based on the first ephemeris data.

Example Embodiment 16. The method of Example Embodiment 15, further comprising transmitting third ephemeris data associated with the first cell.

Example Embodiment 17. The method of any of Example Embodiments 15-16, wherein the second cell is a neighbor cell.

Example Embodiment 18. The method of any of Example Embodiments 15-16 wherein the second cell will replace the first cell.

Example Embodiment 19. The method of any of Example Embodiments 15-19, wherein the first and/or second ephemeris data is rough ephemeris data comprising less than complete ephemeris data.

Example Embodiment 20. The method of Example Embodiment 19, wherein the rough ephemeris data comprises data in which the complete ephemeris data is reduced using at least one of the following: removing one or more of the least significant bits of the complete ephemeris data; or rounding the complete ephemeris data.

Example Embodiment 21. The method of Example Embodiment 19, wherein the rough ephemeris data comprises delta information for the second cell relative to complete ephemeris data associated with the first cell.

Example Embodiment 22. The method of Example Embodiment 19, further comprising transmitting full ephemeris data associated with the second cell, the full ephemeris data comprising additional data not contained in the rough ephemeris data.

Example Embodiment 23. The method of any of Example Embodiments 15-22 further comprising receiving a request from the wireless device for ephemeris data.

Example Embodiment 24. The method of Example Embodiment 23 wherein the request is made for the full ephemeris data and is received after transmitting the rough ephemeris data.

Example Embodiment 25. The method of any of Example Embodiments 15-24 wherein the second ephemeris data is received periodically.

Example Embodiment 26. The method of Example Embodiment 25 wherein the periodicity changes over time such that it is transmitted more often the closer in time the second cell is to replacing the first cell.

Example Embodiment 27. The method of any of Example Embodiments 15-26 wherein the second ephemeris data comprises ephemeris data associated with at least a third cell in addition to the second cell.

Example Embodiment 28. The method of any of Example Embodiments 15-27 wherein the ephemeris data is received with system information.

Example Embodiment 29. The method of any of the previous embodiments, further comprising: obtaining user data; and forwarding the user data to a host computer or a wireless device.

Example Embodiment 30. A wireless device comprising: processing circuitry configured to perform any of the steps of any of Example Embodiments 1 to 14; and power supply circuitry configured to supply power to the wireless device.

Example Embodiment 31. A NTN network node comprising: processing circuitry configured to perform any of the steps of any of Example Embodiments 15 to 29; power supply circuitry configured to supply power to the NTN network node.

Example Embodiment 32. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 14; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 33. A communication system including a host computer comprising: processing circuitry configured to provide user data; and a communication interface configured to forward the user data to a cellular network for transmission to a user equipment (UE), wherein the cellular network comprises a NTN network node having a radio interface and processing circuitry, the NTN network node's processing circuitry configured to perform any of the steps of any of Example Embodiments 15 to 29.

Example Embodiment 34. The communication system of the previous embodiment further including the NTN network node.

Example Embodiment 35. The communication system of the previous 2 embodiments, further including the UE, wherein the UE is configured to communicate with the NTN network node.

Example Embodiment 36. The communication system of the previous 3 embodiments, wherein: the processing circuitry of the host computer is configured to execute a host application, thereby providing the user data; and the UE comprises processing circuitry configured to execute a client application associated with the host application.

Example Embodiment 37. A method implemented in a communication system including a host computer, a NTN network node and a user equipment (UE), the method comprising: at the host computer, providing user data; and at the host computer, initiating a transmission carrying the user data to the UE via a cellular network comprising the NTN network node, wherein the NTN network node performs any of the steps of any of Example Embodiments 15 to 29.

Example Embodiment 38. The method of the previous embodiment, further comprising, at the NTN network node, transmitting the user data.

Example Embodiment 39. The method of the previous 2 embodiments, wherein the user data is provided at the host computer by executing a host application, the method further comprising, at the UE, executing a client application associated with the host application.

Example Embodiment 40. A user equipment (UE) configured to communicate with a NTN network node, the UE comprising a radio interface and processing circuitry configured to performs the of the previous 3 embodiments.

Example Embodiment 41. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of Example Embodiments 1 to 14.

Example Embodiment 42. The communication system of the previous embodiment, wherein the cellular network further includes a NTN network node configured to communicate with the UE.

Example Embodiment 43. The communication system of the previous 2 embodiments, wherein: the processing circuitry of the host computer is configured to execute a host application, thereby providing the user data; and the UE's processing circuitry is configured to execute a client application associated with the host application.

Example Embodiment 44. A method implemented in a communication system including a host computer, a NTN network node and a user equipment (UE), the method comprising: at the host computer, providing user data; and at the host computer, initiating a transmission carrying the user data to the UE via a cellular network comprising the NTN network node, wherein the UE performs any of the steps of any of Example Embodiments 1 to 14.

Example Embodiment 45. The method of the previous embodiment, further comprising at the UE, receiving the user data from the NTN network node.

Example Embodiment 46. A communication system including a host computer comprising: communication interface configured to receive user data originating from a transmission from a user equipment (UE) to a NTN network node, wherein the UE comprises a radio interface and processing circuitry, the UE's processing circuitry configured to perform any of the steps of any of Example Embodiments 1 to 14.

Example Embodiment 47. The communication system of the previous embodiment, further including the UE.

Example Embodiment 48. The communication system of the previous 2 embodiments, further including the NTN network node, wherein the NTN network node comprises a radio interface configured to communicate with the UE and a communication interface configured to forward to the host computer the user data carried by a transmission from the UE to the NTN network node.

Example Embodiment 49. The communication system of the previous 3 embodiments, wherein: the processing circuitry of the host computer is configured to execute a host application; and the UE's processing circuitry is configured to execute a client application associated with the host application, thereby providing the user data.

Example Embodiment 50. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 51. A method implemented in a communication system including a host computer, a NTN network node and a user equipment (UE), the method comprising: at the host computer, receiving user data transmitted to the NTN network node from the UE, wherein the UE performs any of the steps of any of Example Embodiments 1 to 14.

Example Embodiment 52. The method of the previous embodiment, further comprising, at the UE, providing the user data to the NTN network node.

Example Embodiment 53. The method of the previous 2 embodiments, further comprising: at the UE, executing a client application, thereby providing the user data to be transmitted; and at the host computer, executing a host application associated with the client application.

Example Embodiment 54. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 55. A communication system including a host computer comprising a communication interface configured to receive user data originating from a transmission from a user equipment (UE) to a NTN network node, wherein the NTN network node comprises a radio interface and processing circuitry, the NTN network node's processing circuitry configured to perform any of the steps of any of Example Embodiments 15 to 29.

Example Embodiment 56. The communication system of the previous embodiment further including the NTN network node.

Example Embodiment 57. The communication system of the previous 2 embodiments, further including the UE, wherein the UE is configured to communicate with the NTN network node.

Example Embodiment 58. The communication system of the previous 3 embodiments, wherein: the processing circuitry of the host computer is configured to execute a host application; the UE is configured to execute a client application associated with the host application, thereby providing the user data to be received by the host computer.

Example Embodiment 59. A method implemented in a communication system including a host computer, a NTN network node and a user equipment (UE), the method comprising: at the host computer, receiving, from the NTN network node, user data originating from a transmission which the NTN network node has received from the UE, wherein the UE performs any of the steps of any of Example Embodiments 1 to 14.

Example Embodiment 60. The method of the previous embodiment, further comprising at the NTN network node, receiving the user data from the UE.

Example Embodiment 61. The method of the previous 2 embodiments, further comprising at the NTN network node, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As used herein, the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a wireless device, the method comprising:
    receiving ephemeris data from a network node associated with a first cell, the ephemeris data associated with a satellite serving a second cell, wherein the ephemeris data is coarse ephemeris data comprising less than full accuracy than full ephemeris data;
    sending a request for full ephemeris data associated with the second cell, wherein the request for the full ephemeris data associated with the second cell is sent after receiving the course ephemeris data associated with the second cell;
    receiving full ephemeris data associated with the second cell, the full ephemeris data comprising additional data not contained in the coarse ephemeris data;
    using the coarse ephemeris data to locate a beam associated with the second cell; and
    synchronizing with the second cell.

2. The method of claim 1, wherein the coarse ephemeris data comprises data in which the full ephemeris data is reduced by the network node using at least one of the following:
    removing one or more of the least significant bits of the full ephemeris data; or
    rounding the full ephemeris data.

3. The method of claim 1, wherein the coarse ephemeris data comprises delta information relative to full ephemeris data associated with the first or the second cell.

4. The method of claim 1, wherein the ephemeris data is received periodically according to a periodicity.

5. The method of claim 4, wherein the periodicity increases such that the ephemeris data is broadcast more often as a distance between the wireless device and the satellite serving the second cell decreases.

6. The method of claim 1, wherein the ephemeris data comprises additional ephemeris data associated with at least a third cell other than the second cell.

7. A method performed by a network node serving a wireless device in a first cell, the method comprising:
    obtaining ephemeris data associated with a satellite serving a second cell, wherein the ephemeris data is coarse ephemeris data comprising less than full accuracy than full ephemeris data;
    transmitting, to the wireless device, the coarse ephemeris data;
    receiving a request from the wireless device for ephemeris data wherein the request is made for the full ephemeris data and is received after transmitting the coarse ephemeris data.

8. The method of claim 7, wherein the second cell will replace the first cell.

9. The method of claim 7, wherein the coarse ephemeris data comprises data in which the full ephemeris data is reduced using at least one of the following:
    removing one or more of the least significant bits of the full ephemeris data; and
    rounding the full ephemeris data.

10. The method of claim 9, wherein the coarse ephemeris data comprises delta information for the second cell relative to the full ephemeris data associated with the first or the second cell.

11. The method of claim 7, further comprising transmitting full ephemeris data associated with the second cell, the full ephemeris data comprising additional data not contained in the coarse ephemeris data.

12. The method of claim 7, wherein the ephemeris data is transmitted periodically according to a periodicity.

13. The method of claim 12, wherein the periodicity increases such that the ephemeris data is transmitted more often as a distance between the wireless device and the satellite serving the second cell decreases.

14. A wireless device adapted to:
    receive ephemeris data from a network node associated with a first cell, the ephemeris data associated with a satellite serving a second cell, wherein the ephemeris data is coarse ephemeris data comprising less than full accuracy than full ephemeris data;
    send a request for the full ephemeris data associated with the second cell wherein the request made for the full ephemeris data associated with the second cell is sent after receiving the course ephemeris data associated with the second cell;
    use the coarse ephemeris data to locate a beam associated with the second cell; and
    synchronize with the second cell.

15. The wireless device of claim 14, wherein the coarse ephemeris data comprises data in which the full ephemeris data is reduced by the network node using at least one of the following:
    removing one or more of the least significant bits of the full ephemeris data; or
    rounding the full ephemeris data.

16. The wireless device of claim 14, wherein the coarse ephemeris data comprises delta information relative to full ephemeris data associated with the first or the second cell.

17. The wireless device of claim 14, further adapted to receive full ephemeris data associated with the second cell, the full ephemeris data comprising additional data not contained in the coarse ephemeris data.

18. The wireless device of claim 14, wherein the ephemeris data is received periodically according to a periodicity.

19. The wireless device of claim 18, wherein the periodicity increases such that the ephemeris data is broadcast more often as a distance between the wireless device and the satellite serving the second cell decreases.

20. The wireless device of claim 14, wherein the ephemeris data comprises additional ephemeris data associated with at least a third cell other than the second cell.

* * * * *